(12) United States Patent
Dalrymple et al.

(10) Patent No.: US 11,624,919 B2
(45) Date of Patent: Apr. 11, 2023

(54) VARIABLE FOCUS ASSEMBLIES

(71) Applicant: Magic Leap, Inc., Plantation, FL (US)

(72) Inventors: Timothy Mark Dalrymple, Gainesville, FL (US); David Tinch, Laramie, WY (US); Michael Anthony Klug, Austin, TX (US); Clinton Carlisle, Parkland, FL (US); Jason Donald Mareno, Raleigh, NC (US); Arno Leon Konings, Austin, TX (US); Christopher Peter Couste, Fort Lauderdale, FL (US); Charles Robert Schabacker, Plantation, FL (US); Bach Nguyen, Coral Springs, FL (US); Christopher John Laning, Windisch (CH); Roman Patscheider, Winterthur (CH)

(73) Assignee: Magic Leap, Inc., Plantation, FL (US)

( * ) Notice: Subject to any disclaimer, the term of this patent is extended or adjusted under 35 U.S.C. 154(b) by 115 days.

(21) Appl. No.: 16/882,075

(22) Filed: May 22, 2020

(65) Prior Publication Data

US 2020/0371360 A1 Nov. 26, 2020

Related U.S. Application Data

(60) Provisional application No. 62/852,940, filed on May 24, 2019, provisional application No. 62/864,229, (Continued)

(51) Int. Cl.
*G02B 27/01* (2006.01)
*G02B 3/12* (2006.01)
(Continued)

(52) U.S. Cl.
CPC .......... *G02B 27/0172* (2013.01); *G02B 3/12* (2013.01); *G02B 3/14* (2013.01); *G02B 7/06* (2013.01);
(Continued)

(58) Field of Classification Search
CPC ....................... G02B 27/0025; G02B 27/0075; G02B 27/01; G02B 27/0101; G02B 27/017;
(Continued)

(56) References Cited

U.S. PATENT DOCUMENTS 5,371,629 A 12/1994 Kurtin et al.
5,424,793 A * 6/1995 Fukushima ............ G02B 7/102
396/379

(Continued)

FOREIGN PATENT DOCUMENTS

EP 2649485 A1 10/2013
EP 3914959 A1 12/2021
(Continued)

OTHER PUBLICATIONS

U.S. Appl. No. 62/518,539, filed Jun. 12, 2017, Schaefer.
(Continued)

*Primary Examiner* — Jason M Mandeville
(74) *Attorney, Agent, or Firm* — Fish & Richardson P.C.

(57) ABSTRACT

An example head-mounted display device includes a light projector, an optical assembly arranged to direct light from a light projector to a user, and an actuator module. The optical assembly includes a variable focus lens assembly including a rigid refractive component, a shaper ring defining an aperture, and a flexible lens membrane between the shaper ring and the rigid refractive component and covering the aperture. The refractive component, the shaper ring, and the lens membrane are arranged along an axis. The refractive component and the lens membrane define a chamber con- (Continued)

taining a volume of fluid. The actuator module is configured to adjust an optical power of the variable focus lens by moving the shaper ring relative to the refractive component along the axis, such that a curvature of the lens membrane in the aperture is modified.

16 Claims, 22 Drawing Sheets

Related U.S. Application Data filed on Jun. 20, 2019, provisional application No. 62/852,915, filed on May 24, 2019, provisional application No. 62/864,253, filed on Jun. 20, 2019.

(51) Int. Cl.
  *G02B 3/14* (2006.01)
  *G02B 7/06* (2021.01)
  *G02B 26/00* (2006.01)

(52) U.S. Cl.
  CPC .... *G02B 26/004* (2013.01); *G02B 2027/0178* (2013.01)

(58) Field of Classification Search
  CPC .. G02B 27/0172; G02B 27/0955; G02B 3/12; G02B 3/14; G02B 2027/0127; G02B 2027/0178; G02B 7/06; G02B 7/08
  USPC .......................................................... 345/8
  See application file for complete search history.

(56) References Cited

U.S. PATENT DOCUMENTS

| | | |
|---|---|---|
| 6,832,477 B2 | 12/2004 | Gummin et al. |
| 6,850,221 B1 | 2/2005 | Tickle |
| D514,570 S | 2/2006 | Ohta |
| 7,039,309 B2 | 5/2006 | Hsiao |
| 7,758,185 B2 | 7/2010 | Lewis |
| 8,087,778 B2 | 1/2012 | Gupta et al. |
| 8,353,594 B2 | 1/2013 | Lewis |
| 8,696,113 B2 | 4/2014 | Lewis |
| 8,733,927 B1 | 5/2014 | Lewis |
| 8,733,928 B1 | 5/2014 | Lewis |
| 9,010,929 B2 | 4/2015 | Lewis |
| 9,081,426 B2 | 7/2015 | Armstrong |
| 9,215,293 B2 | 12/2015 | Miller |
| 9,235,064 B2 | 1/2016 | Lewis |
| 9,239,473 B2 | 1/2016 | Lewis |
| 9,244,293 B2 | 1/2016 | Lewis |
| D752,529 S | 3/2016 | Loretan et al. |
| 9,348,143 B2 | 5/2016 | Gao et al. |
| D759,657 S | 6/2016 | Kujawski et al. |
| 9,417,452 B2 | 8/2016 | Schowengerdt |
| 9,470,906 B2 | 10/2016 | Kaji et al. |
| 9,547,174 B2 | 1/2017 | Gao et al. |
| 9,658,473 B2 | 5/2017 | Lewis |
| 9,671,566 B2 | 6/2017 | Abovitz et al. |
| D794,288 S | 8/2017 | Beers et al. |
| 9,740,006 B2 | 8/2017 | Gao |
| 9,791,700 B2 | 10/2017 | Schowengerdt |
| D805,734 S | 12/2017 | Fisher et al. |
| 9,851,563 B2 | 12/2017 | Gao et al. |
| 9,857,591 B2 | 1/2018 | Welch et al. |
| 10,151,937 B2 | 12/2018 | Lewis |
| 10,185,147 B2 | 1/2019 | Lewis |
| 10,262,462 B2 | 4/2019 | Miller et al. |
| 10,459,231 B2 | 10/2019 | Miller et al. |
| 10,670,808 B1 | 6/2020 | Frail |
| 11,249,309 B2 | 2/2022 | Schaefer et al. |
| 2004/0141735 A1 | 7/2004 | Nomura |
| 2006/0028436 A1 | 2/2006 | Armstrong |
| 2006/0119218 A1* | 6/2006 | Doshida .............. H01L 41/0973 310/323.01 |
| 2007/0018919 A1 | 1/2007 | Zavracky et al. |
| 2007/0081123 A1 | 4/2007 | Lewis |
| 2009/0251798 A1 | 10/2009 | Huang et al. |
| 2012/0127062 A1 | 5/2012 | Bar-Zeev et al. |
| 2012/0162549 A1 | 6/2012 | Gao et al. |
| 2012/0162581 A1 | 6/2012 | Ashida et al. |
| 2013/0050432 A1 | 2/2013 | Perez et al. |
| 2013/0082922 A1 | 4/2013 | Miller |
| 2013/0117377 A1 | 5/2013 | Miller |
| 2013/0125027 A1 | 5/2013 | Abovitz |
| 2013/0141434 A1 | 6/2013 | Sugden et al. |
| 2013/0208234 A1 | 8/2013 | Lewis |
| 2013/0242262 A1 | 9/2013 | Lewis |
| 2014/0071539 A1 | 3/2014 | Gao |
| 2014/0168035 A1 | 6/2014 | Luebke et al. |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0306866 A1 | 10/2014 | Miller et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0248046 A1 | 9/2015 | Schowengerdt |
| 2015/0268415 A1 | 9/2015 | Schowengerdt et al. |
| 2015/0301356 A1 | 10/2015 | Tabirian et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | Tekolste et al. |
| 2015/0346495 A1 | 12/2015 | Welch et al. |
| 2016/0004102 A1 | 1/2016 | Nisper et al. |
| 2016/0011419 A1 | 1/2016 | Gao |
| 2016/0026253 A1 | 1/2016 | Bradski et al. |
| 2016/0047956 A1 | 2/2016 | Fabirian et al. |
| 2016/0209560 A1 | 7/2016 | Fabirian et al. |
| 2017/0010469 A1 | 1/2017 | Samec et al. |
| 2017/0045742 A1 | 2/2017 | Greenhalgh et al. |
| 2017/0168307 A1 | 6/2017 | Itani |
| 2017/0223344 A1 | 8/2017 | Kaehler |
| 2018/0088381 A1 | 3/2018 | Lin et al. |
| 2018/0129048 A1 | 5/2018 | Robbins et al. |
| 2018/0143473 A1 | 5/2018 | Yamazaki et al. |
| 2018/0314066 A1 | 11/2018 | Bell et al. |
| 2019/0171026 A1 | 6/2019 | Parsons |
| 2020/0058256 A1 | 2/2020 | Seibert et al. |
| 2020/0073143 A1 | 3/2020 | Macnamara et al. |
| 2021/0141212 A1* | 5/2021 | Jacoby ............... G02C 7/14 |
| 2022/0137418 A1 | 5/2022 | Schaefer et al. |

FOREIGN PATENT DOCUMENTS

| | | |
|---|---|---|
| JP | S60010224 A | 1/1985 |
| JP | 2012505430 A | 3/2012 |
| KR | 1020160091402 A | 8/2016 |
| WO | WO2012078410 A1 | 6/2012 |
| WO | WO2015081313 A2 | 6/2015 |
| WO | WO2016181108 A1 | 11/2016 |
| WO | WO2018231784 A1 | 12/2018 |

OTHER PUBLICATIONS

Azuma, "A Survey of Augmented Reality," Presence: Teleoperators and Virtual Environments, Aug. 1997, 6(4):355-385.

Azuma, "Predictive tracking for augmented reality." Dissertation for the degree of Doctor of Philosophy, University of North Carolina at Chapel Hill, Department of Computer Science, Feb. 1995, 262 pages.

Bimber et al., "Spatial Augmented Reality Merging Real and Virtual Worlds," A K Peters, Ltd. (ed.), 2005, 393 pages.

Hitl.washington.edu [online], "Hardware," available on or before Oct. 13, 2005, via Internet Archive: Wayback Machine URL <https://web.archive.org/web/20051013062315/http://www.hitl.washington.edu:80/artoolkit/documentation/hardware.htm>, retrieved on Mar. 3, 2021, URL <http://www.hitl.washington.edu/artoolkit/documentation/hardware.htm>, 3 pages.

(56) References Cited

OTHER PUBLICATIONS

Jacob, "Eye Tracking in Advanced Interface Design," Virtual environments and advanced interface design, 1995, 258:288, 50 pages.
Tanriverdi et al., "Interacting with Eye Movements in Virtual Environments," Proc. of the SIGCHI Conference on Human Factors in Computing Systems, 2000, pp. 265-272.
PCT International Search Report and Written Opinion in International Appln. No PCT/US2020/034401, dated Aug. 26, 2020, 14 pages.
PCT International Search Report and Written Opinion in International Appln. No PCT/US2020/034406, dated Sep. 8, 2020, 14 pages.
Shen et al., "Electrically adjustable location of a projected image in augmented reality via a liquid-crystal lens," Optics Express, Oct. 2015, 23(22): 9 pages.
Extended European Search Report in European Appl. No. 20738194, dated Feb. 7, 2022, 10 pages.
International Preliminary Report on Patentability in International Appln. No. PCT/US2018/37039, dated Dec. 17, 2019, 8 pages.
International Search Report and Written Opinion in International Appln No. PCT/US2018/37039, dated Oct. 30, 2018, 16 pages.
International Search Report and Written Opinion in International Appln No. PCT/US2022/020181, dated Jun. 29, 2022, 13 pages.
Invitation to Pay Additional Fees in International Appln. No. PCT/US2018/37039, dated Aug. 27, 2018, 3 pages.
Office Action in Indian Appln. No. 202047018987, dated Mar. 29, 2022, 5 pages.
Office Action in Japanese Appln. No. 2019-568041, dated Apr. 27, 2022, 12 pages (with English translation).
Tabiryan et al., "Superlens in the skies: liquid-crystal-polymer technology for telescopes," SPIE, Feb. 2016, 2 pages.

* cited by examiner

VARIABLE FOCUS ASSEMBLIES

CLAIM OF PRIORITY

This application claims priority under 35 U.S.C. § 119(e) to U.S. Patent Application Ser. No. 62/852,940, filed on May 24, 2019, U.S. Patent Application Ser. No. 62/864,229, filed on Jun. 20, 2019, U.S. Patent Application Ser. No. 62/852,915, filed on May 24, 2019, U.S. Patent Application Ser. No. 62/864,253, filed on Jun. 20, 2019 and the entire contents of which are hereby incorporated by reference.

TECHNICAL FIELD

This disclosure relates to optics assemblies, and more specifically to compact variable focus configurations.

BACKGROUND

A mixed reality or augmented reality display device can be used to present virtual image information in conjunction with imagery from the physical world. In some implementations, such a display device can include one or more optical elements (e.g., lenses) to facilitate the presentation of the virtual image information in multiple focal planes.

SUMMARY

In an aspect a head-mounted display device includes a light projector, an optical assembly arranged to receive light from the light projector and direct the light to a user during use of the head-mounted display device, and an actuator module coupled to the variable focus lens assembly. The optical assembly includes a variable focus lens assembly including a rigid refractive component, a shaper ring defining an aperture, and a flexible lens membrane between the shaper ring and the rigid refractive component. The flexible lens membrane covers the aperture. The rigid refractive component, the shaper ring, and the flexible lens membrane are arranged along an axis. The rigid refractive component and the flexible lens membrane define a chamber between the flexible lens membrane and the refractive component. A volume of fluid is disposed within the chamber. The actuator module is configured to adjust an optical power of the variable focus lens by moving the shaper ring relative to the rigid refractive component along the axis, such that a curvature of the flexible lens membrane in the aperture is modified.

Implementations of this aspect can include one or more of the following features.

In some implementations, the actuator module can be configured to move the shaper ring relative to the rigid refractive component through a range of motion. The variable focus lens assembly can be configured such that the chamber has a constant volume when the shaper ring is moved relative to the rigid refractive component through the range of motion.

In some implementations, the actuator module can be configured to increase the curvature of the flexible lens membrane by moving the shaper ring towards the rigid refractive component along the axis.

In some implementations, the actuator module can be configured to decrease the curvature of the flexible lens membrane by moving the shaper ring away from the rigid refractive component along the axis.

In some implementations, the variable focus lens assembly can further include an annular membrane disposed within the aperture. The volume of fluid can be encapsulated by the rigid refractive component, the flexible lens, and annular membrane.

In some implementations, the shaper ring can be rigid.

In some implementations, the variable focus lens assembly can further include a carrier frame, and a cam ring nested within the carrier frame. The shaper ring can be nested within the cam ring. The cam ring can be configured such that a rotation of the cam ring relative to the carrier frame about the axis causes the shaper ring to move relative to the rigid refractive component along the axis.

In some implementations, the actuator module can be configured to rotate the cam ring about the axis.

In some implementations, the actuator module can include one or more actuator components coupled to the cam ring selected from the following group: rotary motors, stepper motors, servo motors, ultrasonic motors, piezoelectric actuators, and electromechanical actuators.

In some implementations, the actuator module can include a shape memory alloy wire coupled to the cam ring, and a heat source configured to apply heat to the shape memory alloy wire. The actuator module can be configured such that an application of heat to the shape memory alloy wire causes a change in a length of the shape memory alloy wire and a rotation of the cam ring relative to the carrier frame about the axis.

In some implementations, the actuator module can include a shape memory alloy spring, a bias spring opposing the shape memory alloy spring, a linkage wire coupled to (i) one of the shape memory alloy spring or the bias spring and (ii) the cam ring, and a heat source configured to apply heat to the shape memory alloy wire. The actuator module can be configured such that an application of heat to the shape memory alloy wire causes a change in a length of the shape memory alloy spring and a rotation of the cam ring relative to the carrier frame about the axis.

In some implementations, the actuator module can include one or more permanent magnets disposed along a periphery of one of the carrier frame or the cam ring, and electrical windings disposed along a periphery of the other one of the carrier frame or the cam ring opposite the one or more permanent magnets.

In some implementations, the actuator module can include one or more permanent magnets disposed along a periphery of one of the carrier frame or the cam ring, and electrical windings disposed along a periphery of the other one of the carrier frame or the cam ring opposite the one or more permanent magnets.

In some implementations, the actuator module can include a plate including a piezoelectric material, one or more arms extending from the plate and coupled to a mechanical ground, and one or more mounting structures disposed on the plate. Each mounting structure can be mounted to a respective portion of the optical assembly.

In some implementations, the actuator module can be configured to vibrate the plate according to at least two vibration modes.

In some implementations, the plate can include a pair of opposing first edges extending a first direction, and a pair of opposing second edges extending a second direction orthogonal to the first direction, where the first edges are longer than the second edges. According to a first vibration mode, the first edges can be displaced relative to a center of the plate in a third direction orthogonal to the first direction and the second direction. According to a second vibration mode, the second edges can be displaced relative to one another in the second direction.

In some implementations, the optical assembly can include a second variable focus lens assembly concentric with the variable focus lens assembly. The actuator module can be configured, during use of the head-mounted display device, to adjust the optical power of the variable focus lens assembly and an optical power of the second variable focus lens assembly, such that the optical power of the variable focus lens assembly is the inverse of the optical power of the second variable focus lens assembly.

In some implementations, the optical assembly can further include an eyepiece disposed between the variable focus lens assembly and the second variable focus lens assembly. The eyepiece can be configured to receive the light from the light projector and direct the light through one of the variable focus lens assembly or the second variable focus lens assembly to the user during use of the head-mounted display device.

In some implementations, the head-mounted display device can further include a control module configured to control the actuator module during use of the head-mounted display device, such that the optical power of the variable focus lens assembly is the inverse of the optical power of the second variable focus lens assembly.

In some implementations, the head-mounted display of claim 1 can further include a frame attached to the light projector, the optical assembly, and the actuator module. The frame can be configured, when worn by the user, to orient the optical assembly such that the optical axis extends towards an eye of the user.

In some implementations, the optical assembly can include a second variable focus lens assembly including a second rigid refractive component, a second shaper ring defining a second aperture, and a second flexible lens membrane between the second shaper ring and the second rigid refractive component. The second flexible lens membrane can cover the second aperture. The second rigid refractive component, the second shaper ring, and the second flexible lens membrane can be arranged along the axis. The second rigid refractive component and the second flexible lens membrane can define a second chamber between the second flexible lens membrane and the second rigid refractive component. A second volume of fluid can be disposed within the second chamber. The actuator module can be configured to adjust an optical power of the second variable focus lens by moving the second shaper ring relative to the second rigid refractive component along the axis, such that a curvature of the second flexible lens membrane in the aperture is modified. The optical assembly can further include a support structure securing the variable focus lens assembly to the second variable lens assembly. The support structure can include a material having a thermal expansion property such that, in a range of temperatures of the optical assembly: a variation in distance between the rigid refractive component and the shaper ring due to a variation in the temperature is less than a threshold value, and a variation in distance between the second rigid refractive component and the second shaper ring due to the variation in the temperature is less than a threshold value.

In some implementations, the supporting structure can include a first arm mounted to the shaper ring, a second arm mounted to the second rigid refractive component, and a bar extending from the first arm to the second arm.

In some implementations, the actuator module can be configured, during use of the head-mounted display device, to adjust the optical power of the variable focus lens assembly and the optical power of the second variable focus lens assembly, such that the optical power of the variable focus lens assembly is the inverse of the optical power of the second variable focus lens assembly.

In some implementations, the optical assembly can further include an eyepiece disposed between the variable focus lens assembly and the second variable focus lens assembly. The eyepiece can be configured to receive the light from the light projector and direct the light through one of the variable focus lens assembly or the second variable focus lens assembly to the user during use of the head-mounted display device.

In some implementations, the head-mounted display device can further include a control module configured to control the actuator module during use of the head-mounted display device, such that the optical power of the variable focus lens assembly is the inverse of the optical power of the second variable focus lens assembly.

In another aspect, a method of presenting image content to a user using a head-mounted display device includes generating light using a light projector of a head-mounted display device, and directing the light to an eye of a user using an optical assembly of the head-mounted display device. The optical assembly includes a variable focus lens assembly including a rigid refractive component, a shaper ring defining an aperture, and a flexible lens membrane between the shaper ring and the rigid refractive component, the flexible lens membrane covering the aperture. The rigid refractive component, the shaper ring, and the flexible lens membrane are arranged along an axis. The rigid refractive component and the flexible lens membrane define a chamber between the flexible lens membrane and the refractive component. A volume of fluid is disposed within the chamber. The head-mounted display device also includes an actuator module coupled to the variable focus lens assembly. The method also includes adjusting an optical power of the optical assembly. Adjusting the optical power of the optical assembly includes moving the shaper ring relative to the rigid refractive component along the axis using the actuator module, such that a curvature of the flexible lens membrane in the aperture is modified.

Implementations of this aspect can include one or more of the following features.

In some implementations, adjusting the optical power of the optical assembly can include increasing the curvature of the flexible lens membrane by moving the shaper ring towards the rigid refractive component along the axis.

In some implementations, adjusting the optical power of the optical assembly can include decreasing the curvature of the flexible lens membrane by moving the shaper ring away from the rigid refractive component along the axis.

In some implementations, the variable focus lens assembly can further include a carrier frame, and a cam ring nested within the carrier frame, where the shaper ring is nested within the cam ring. Adjusting the optical power of the optical assembly can include rotating, using the actuator module, the cam ring relative to the carrier frame about the axis to cause the shaper ring to move relative to the rigid refractive component along the axis.

In some implementations, the actuator module can include a shape memory alloy wire coupled to the cam ring, and a heat source configured to apply heat to the shape memory alloy wire. Adjusting the optical power of the optical assembly can include applying heat to the shape memory alloy wire to change in a length of the shape memory alloy wire and to rotate the cam ring relative to the carrier frame about the axis.

In some implementations, the actuator module can include a shape memory alloy spring, a bias spring opposing the shape memory alloy spring, a linkage wire coupled to (i) one of the shape memory alloy spring or the bias spring and (ii) the cam ring, and a heat source configured to apply heat to the shape memory alloy wire. Adjusting the optical power of the optical assembly can include applying heat to the shape memory alloy wire to change in a length of the shape memory alloy spring and to rotate the cam ring relative to the carrier frame about the axis.

In some implementations, the actuator module can include one or more permanent magnets disposed along a periphery of one of the carrier frame or the cam ring, and electrical windings disposed along a periphery of the other one of the carrier frame or the cam ring opposite the one or more permanent magnets. Adjusting the optical power of the optical assembly can include applying electrical current to the electrical windings to rotate the cam ring relative to the carrier frame about the axis.

In some implementations, the actuator module can include plate including a piezoelectric material, one or more arms extending from the plate and coupled to a mechanical ground, and one or more mounting structures disposed on the plate. Each mounting structure can be mounted to a respective portion of the optical assembly. Adjusting the optical power of the optical assembly can include vibrating the plate according to at least two vibration modes.

In some implementations, the plate can include a pair of opposing first edges extending a first direction, and a pair of opposing second edges extending a second direction orthogonal to the first direction, where the first edges are longer than the second edges. Vibrating the plate according to according to a first vibration mode of the at least two vibration modes can include displacing the first edges relative to a center of the plate in a third direction orthogonal to the first direction and the second direction.

In some implementations, vibrating the plate according to according to a second vibration mode of the at least two vibration modes can include displacing the second edges relative to one another in the second direction.

In some implementations, the optical assembly can include a second variable focus lens assembly concentric with the variable focus lens assembly. The method can include adjusting an optical power of the second variable focus lens assembly concurrently with adjust the optical power of the variable focus lens assembly, such that the optical power of the variable focus lens assembly is the inverse of the optical power of the second variable focus lens assembly.

In some implementations, Directing the light to the eye of the user can include directing the light through one of the variable focus lens assembly or the second variable focus lens assembly to the eye of the user.

The details of one or more embodiments are set forth in the accompanying drawings and the description below. Other features and advantages will be apparent from the description and drawings, and from the claims.

DETAILED DESCRIPTION

Figure 1:
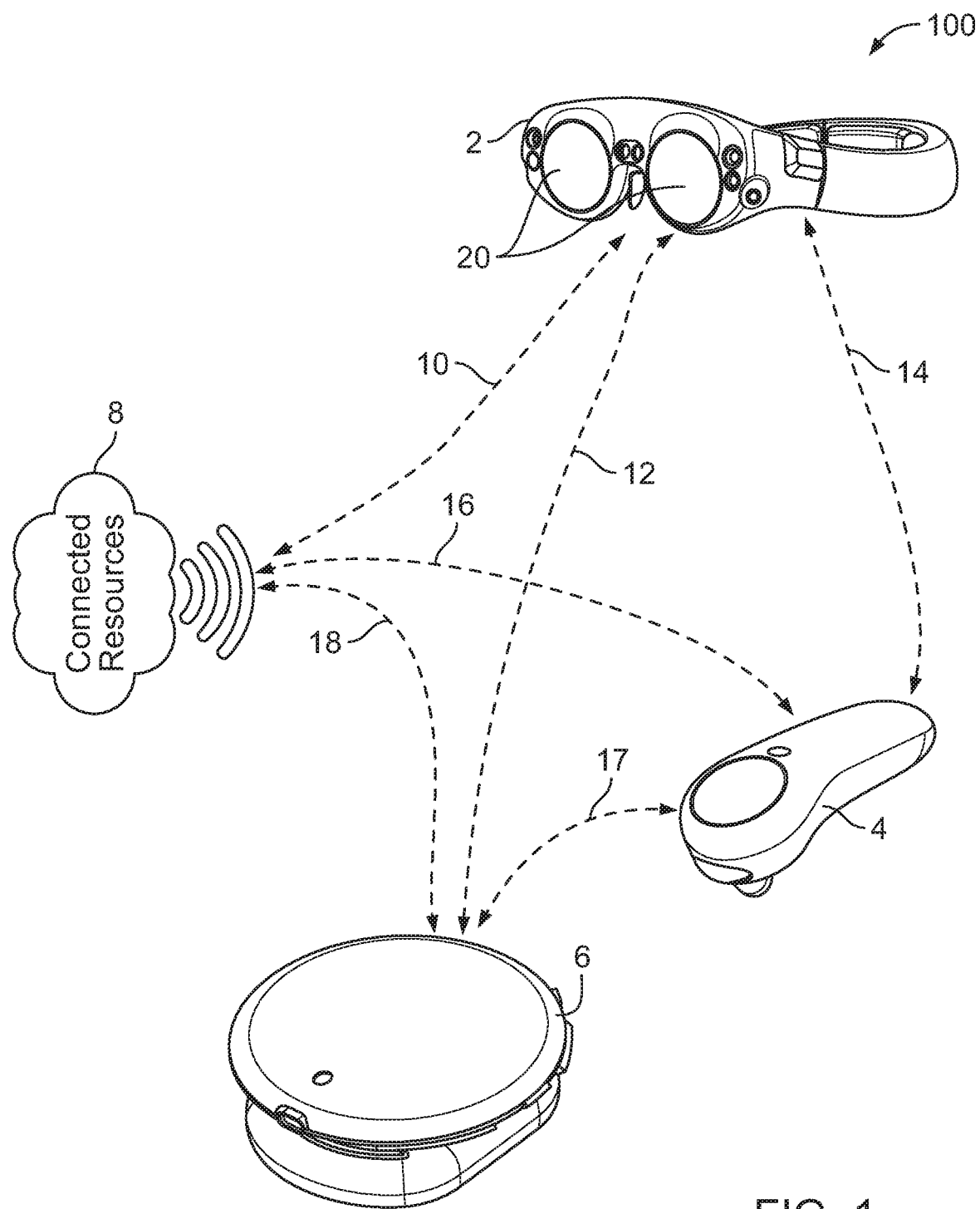
FIG. 1 is a diagram of an example augmented reality system.
Figure 2A:
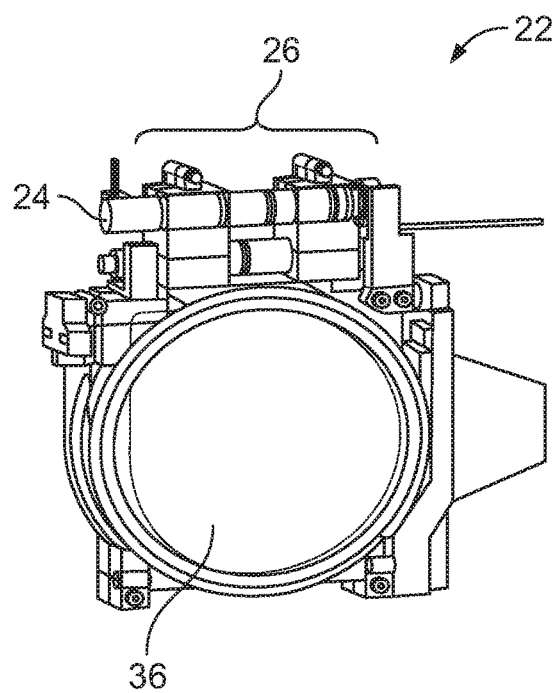
FIGS. 2A-2C and 3 are diagrams of an example variable focus assembly.
Figure 2B:
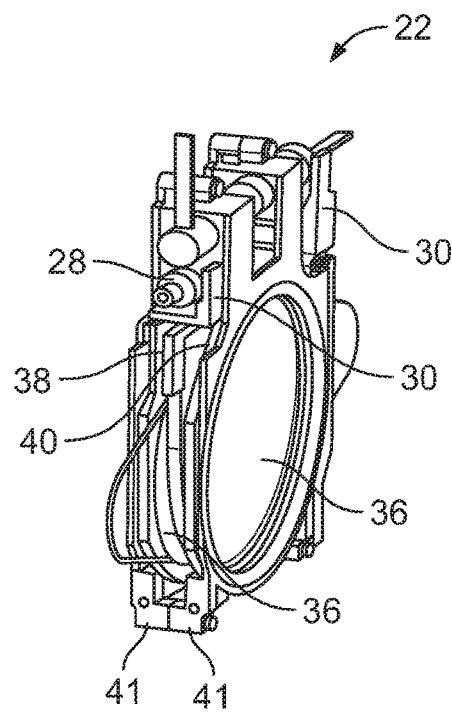
Figure 2C:
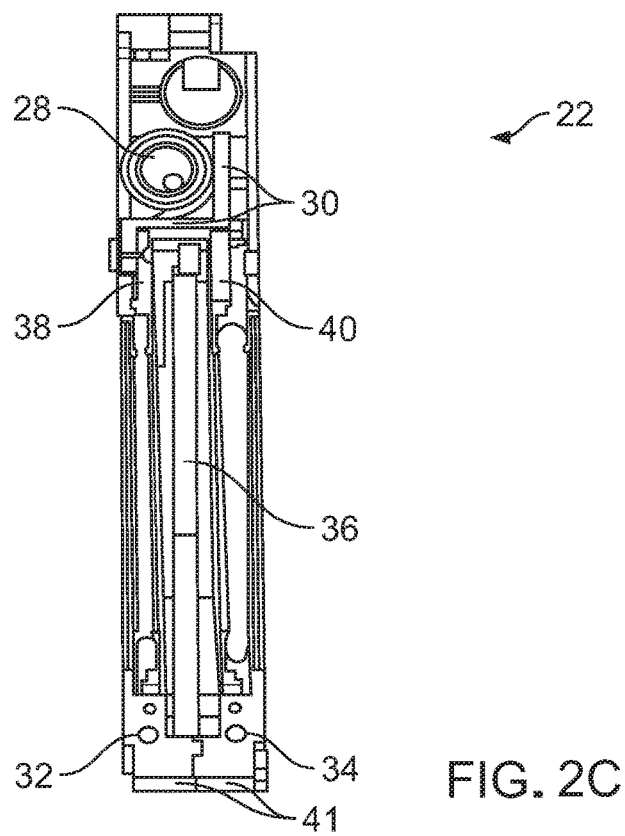
Figure 3:
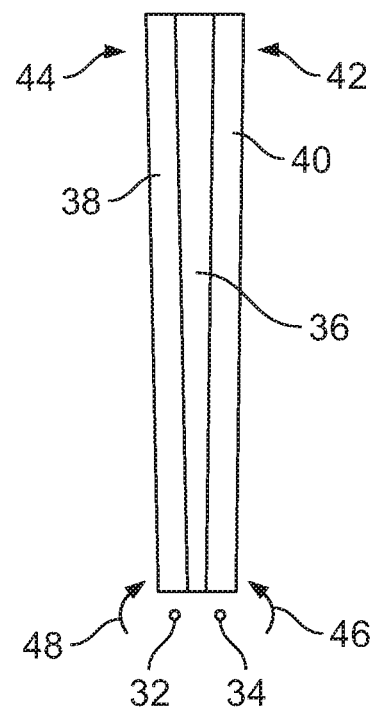

FIG. 1 shows an example augmented reality system 100 including a head-worn viewing component 2, a hand-held controller component 4, and an optional interconnected auxiliary computing or controller component 6 which may be configured to be worn as a belt pack or the like on the user. Each of these components may be communicatively connected to one another (e.g., via connections 10, 12, 14, 16, 17, and 18) to communicate with each other and to other connected resources 8 (e.g., cloud computing or cloud storage resources). In some implementations, one or more of the connections 10, 12, 14, 16, 17, and 18 can be wired couplings or wireless connections, such as those specified by Institute of Electrical and Electronics Engineers (IEEE) 802.11, Bluetooth®, and other connectivity standards and configurations. Further, the viewing component 2 includes one or more optical elements 20 that enable a user wearing the viewing component 2 to see the world around him in conjunction with virtual image information generated and presented by the system 100 (e.g., to facilitate an "augmented reality" experience). Such a system and experience is described further in U.S. patent application Ser. Nos. 14/555,585, 14/690,401, 14/331,218, 15/481,255, and 62/518,539, each of which is incorporated by reference in its entirety.

The optical elements 20 can include one or more variable focus assemblies to present image information according to any suitable number of focal planes. In some implementations, the optical elements 20 be configured to present image information according to a spectrum of focal plane that are selectable or tunable by an integrated control system (e.g., a control system included in the auxiliary computing or controller component 6, or included in the viewing component 2).

An example variable focus assembly 22 is shown in FIGS. 2A-2C and 3. The optical element 22 includes a lens 36 having a volume of fluid that is at least partially enclosed by a membrane. Further, the variable focus assembly 22 is configured such that upon rotation of a motor 24, an associated mechanical drive assembly 26 rotationally drives a cam member 28 against a lever assembly 30, which causes two opposing perimetric plates 38 and 40 to rotate (e.g., in directions 48 and 46) relative to a main housing assembly 41, and rotate about associated rotation pin joints 32 and 34. This causes the lens 36 to be squeezed (e.g., in directions 44 and 42) or released (e.g., in directions opposite 44 and 42, respectively), depending upon the position of the motor 24 and the cam 28. This squeezing, releasing, and reorientation of the opposing perimetric plates 38 and 40 relative to one another changes the focus of the lens 36, thus providing an electromechanically adjustable variable focus assembly.

In some implementations, the variable focus assembly 22 may be relatively bulky, and thus may be less suitable for use in a head-worn display device (e.g., the viewing component 2). Further, during operation of the variable focus assembly 22, the opposing perimetric plates 38 and 40 are reoriented relative to each other (e.g., as each of them pivots at the bottom relative to the frame that couples the assembly). Thus, there may be a concomitant change in image position as the focus is varied. This introduces a complicating variable in presenting image information, which may make calibrating and/or configuring a head-worn display device more complex or resource intensive. Nevertheless, in some implementations, the variable focus assembly 22 can be used in a head-worn display device to present image information to a user according to multiple focal planes.

Additional examples of variable focus assemblies are described below. In some implementations, a head-worn display device can include one or more of these variable focus assemblies, either in conjunction with or instead of the variable focus assembly 22 described above.

Rotational Cam Ring Configuration

Figures 8A, 8B:
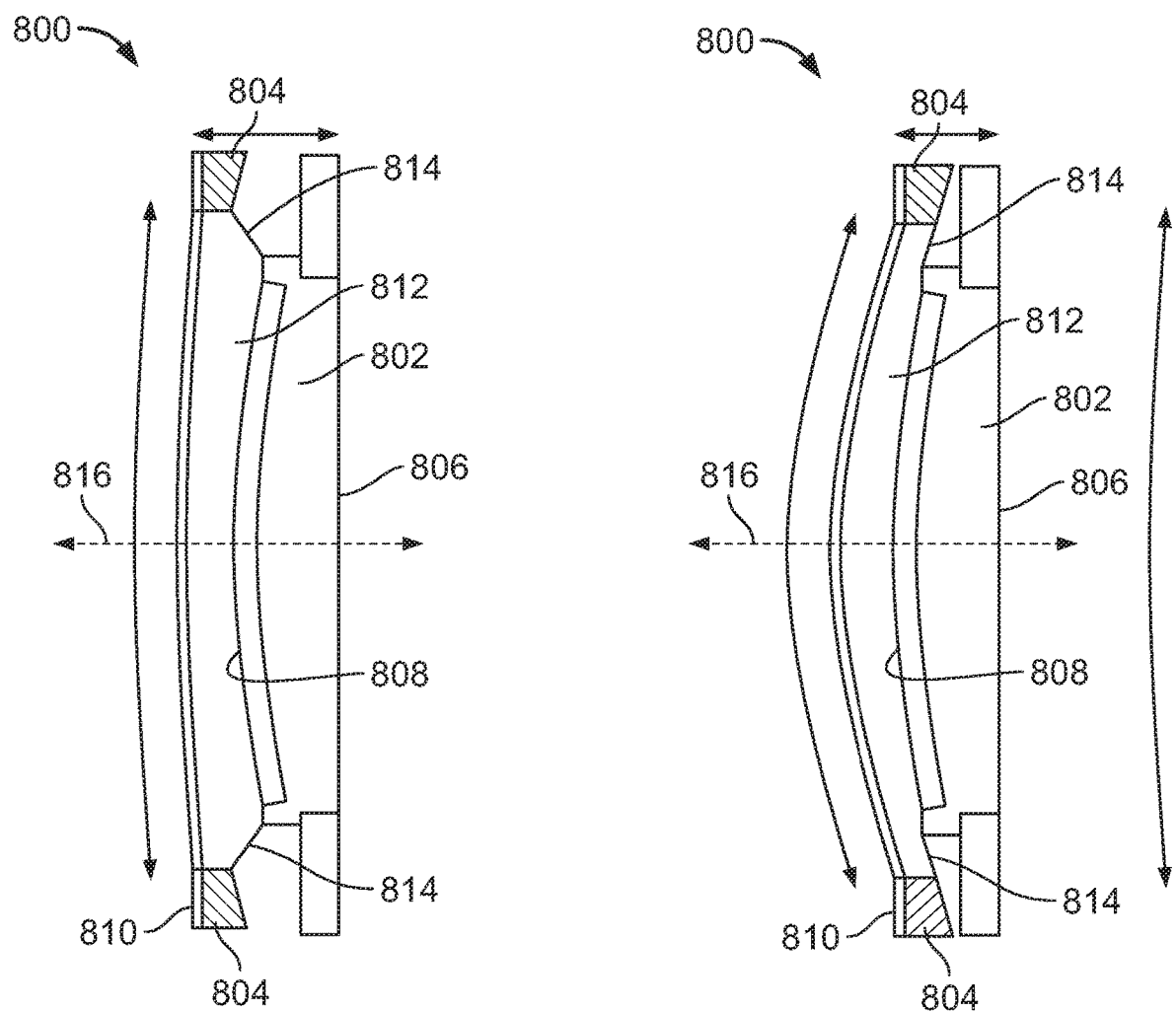
FIGS. 8A and 8B are diagrams of an example liquid lens assembly.

FIGS. 8A and 8B show, in cross-section, an example liquid lens assembly 800 having a rotational cam ring configuration. The liquid lens assembly 800 can be used, for example, as a variable focus assembly in a head-worn display device.

The liquid lens assembly 800 is operable to adjust a curvature of a membrane enclosing a fluid volume within the liquid lens assembly 800, thereby changing an optical power of the liquid lens assembly 800. For example, light traveling through the fluid volume has a wave front that can be altered when the light encounters the curved surface of the membrane enclosing the fluid volume. A change in the wave front of the light corresponds to a change in focus of the light.

In some implementations, the liquid lens assembly 800 includes a rigid refractive component 802 and a rigid shaper ring 804. The refractive component is composed, at least in part, of a solid, optically transparent material (e.g., plastic or glass), and can have flat surfaces, curved surfaces, or one flat and one curved surface (e.g., the surfaces 806 and 808, respectively). The shaper ring is composed, at least in part, by a rigid material such as metal (e.g., aluminum, steel, or titanium), plastic, or other suitably lightweight and rigid materials.

Further, the liquid lens assembly 800 includes an annular membrane 814 and a flexible lens membrane 810. The flexible lens membrane 810 spans the shaper ring 804, such that the flexible lens membrane 810 is attached to the shaper ring 804 (e.g., secured directly onto the shaper ring 804) along the entire circumference of the shaper ring 804 to create a seal. A constant volume of substantially incompressible fluid 812 is encapsulated between the flexible lens membrane 810, the shaper ring 804, the refractive component 802, and the annular membrane 814. The annular membrane 814 is flexible to allow axial motion of the shaper ring 804 relative to the refractive component 802 while keeping the fluid 812 sealed within the liquid lens assembly 800.

As an example, the shaper ring 804 can be moved towards the refractive component 802 along an optical axis 816 of the liquid lens assembly 800 (e.g., from the configuration shown in FIG. 8A to the configuration shown in FIG. 8B). This causes the flexible lens membrane 810 to be pressed against the fluid 812, thereby increasing the curvature of the flexible lens membrane 810 and the fluid 812. Correspondingly, the optical power of the liquid lens assembly 800 is increased.

As another example, the shaper ring 804 can be moved away from the refractive component 802 along the optical axis 816 (e.g., from the configuration shown in FIG. 8B to the configuration shown in FIG. 8A). This causes the flexible lens membrane 810 to be moved away from the fluid 812, thereby decreasing the curvature of the flexible lens membrane 810 and the fluid 812. Correspondingly, the optical power of the liquid lens assembly 800 is decreased.

Figure 9:
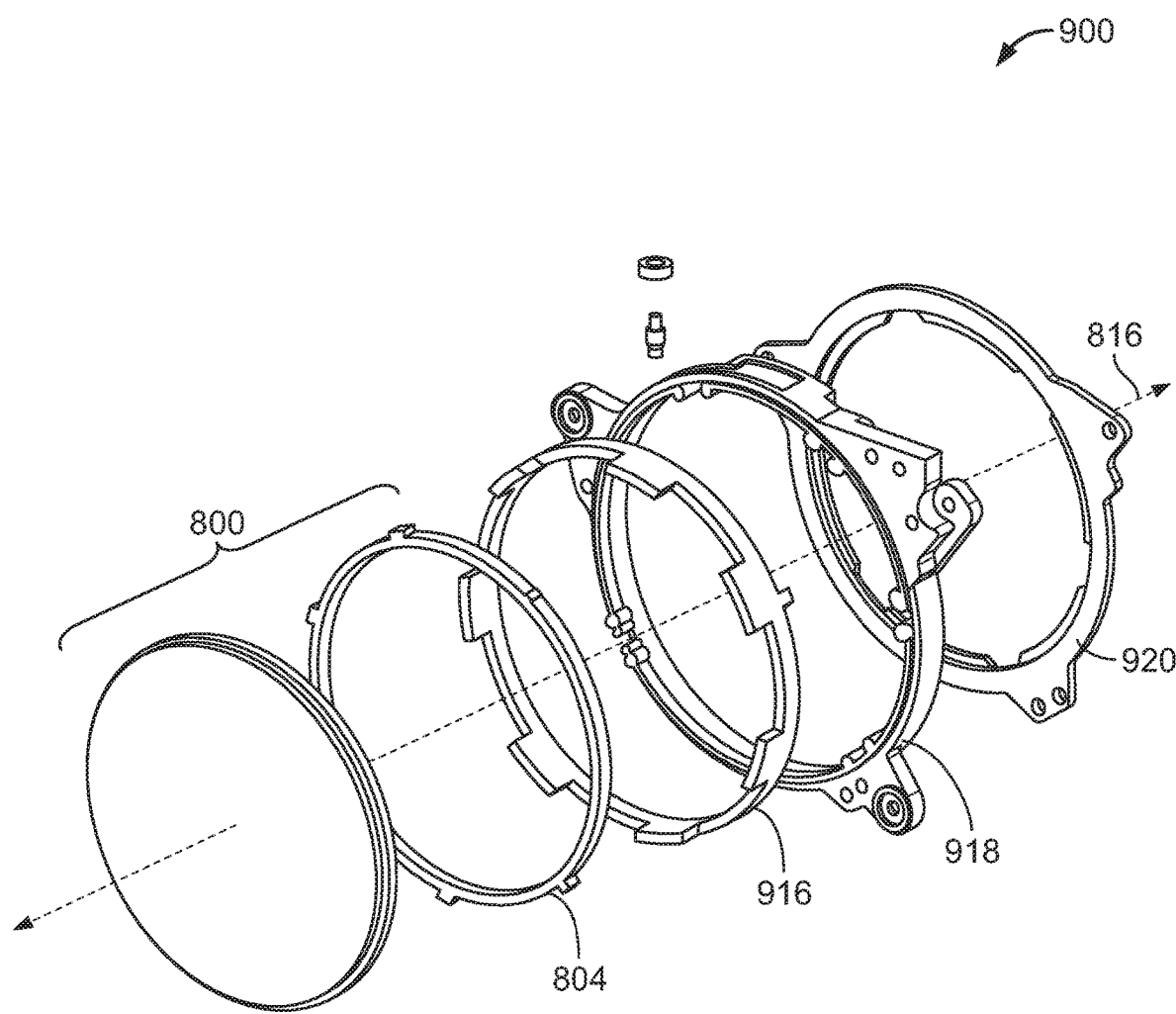
FIG. 9 is a diagram of an exploded view of a variable focus assembly.

FIG. 9 shows an exploded view of a variable focus assembly 900 including the liquid lens assembly 800, a cam ring 916, a carrier frame 918, and a cap 920. For ease of illustration, of the components of the liquid lens assembly 800, only the shaper ring 804 is shown individually.

As shown in FIG. 9, the liquid lens assembly 800, including the shaper ring 804, nests within a cam ring 916. The shaper ring 804 and the cam ring 916 each include mechanical features (e.g., threads, grooves, lugs, splines, ramps, pins, teeth, protrusions, or other structures) that are engaged with one another, such that rotational motion of the cam ring 916 results in axial motion of the shaper ring 804 along the optical axis 816. The axial motion of the shaper ring 804 presses the flexible lens membrane 810 of the liquid lens assembly 800 against the fluid 912 or moves the flexible lens membrane 810 away from the fluid 812, thereby causing the fluid 912 and the flexible membrane 810 to change shape (e.g., increasing or decreasing their curvatures, as described above).

In some implementations, the cam ring 916 and liquid lens assembly 800 can nest within a carrier frame 918. The cam ring 916 can be rotatable with respect to both the carrier frame 918 and the shaper ring 804. The shaper ring 804 can be constrained from rotating with respect to the carrier ring 918 (e.g., by one or more teeth, protrusions, or other structures). However, the shaper ring 804 is axially movable with respect to both the cam ring 916 and the carrier frame 918 along the optical axis 922. Further, the cap 920 can be fixed to the carrier frame 918 to secure the position of components that are housed within or mounted to the carrier frame (e.g., the cam ring 918).

In some implementations, one or more actuator modules can be used to adjust the optical power of the liquid lens assembly 800. For example, one or more actuator modules can be used to impart a relative rotational motion between the cam ring 916 and both the carrier frame 918 and the shaper ring 804, thereby causing the shaper ring 804 to move axially along the optical axis 816 relative to the refractive component 802.

Figure 10A:
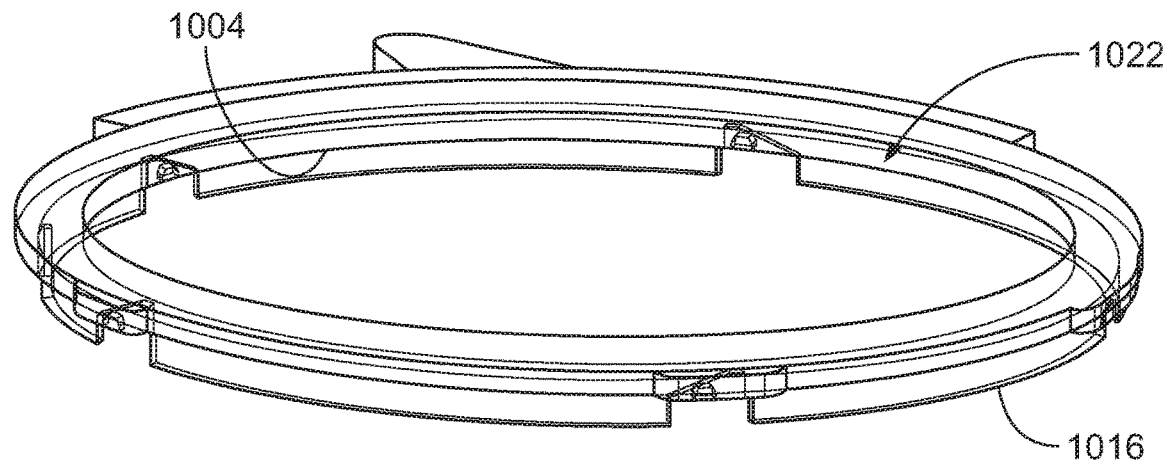
FIGS. 10A and 10B are diagrams showing example surface geometry at an interface between a shaper ring and a cam ring.
Figure 10B:
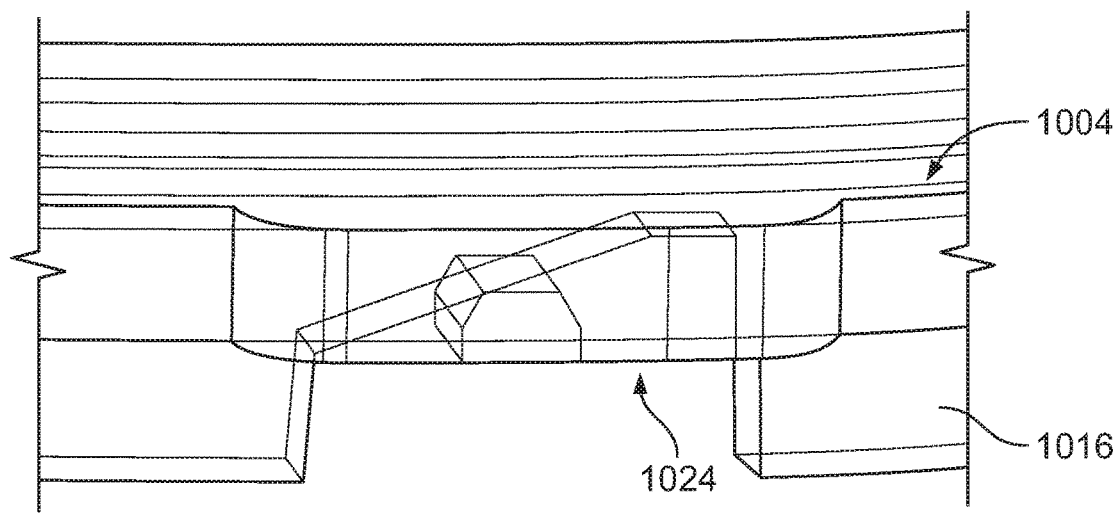

FIGS. 10A and 10B show example surface geometry at an interface 1022 between the shaper ring 804 and the cam ring 916. The shaper ring 804 includes several lugs 1024 extending in an axial direction and engaging a helical spline 1026 on the cam ring 916, such that an axial motion is imparted on the shaper ring 804 when the cam ring 916 rotates.

In some implementations, other geometries, such as ramps, steps, guide pins, and other mechanical features can be used to guide axial motion of the shaper ring 804 relative to the cam ring 916. In particular, suitable geometries can be used to convert relative rotation of the cam ring 916 with respect to the shaper ring 804 into axial movement of the shaper ring 804 with respect to the cam ring 916.

Actuation

Figure 11:
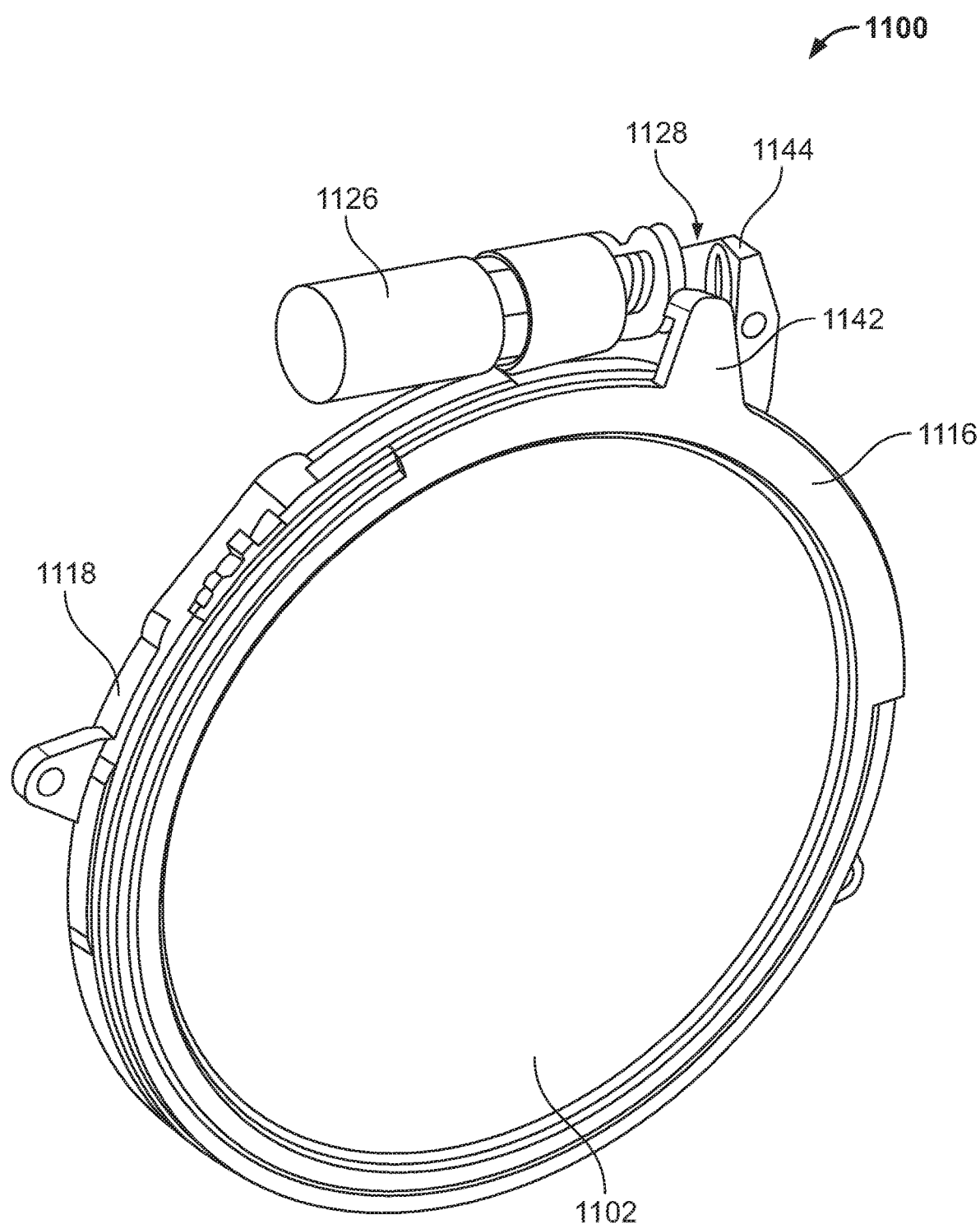
FIG. 11 is a diagram of another example variable focus assembly.

FIG. 11 shows a perspective view of an example variable focus assembly 1100. The variable focus assembly 1100 includes a carrier frame 1118, a cam ring 1116, and a liquid lens assembly 1102 similar to the corresponding components described in FIGS. 8, 9, 10A, and 10B.

Further, the variable focus assembly 1100 includes an actuator 1126 fixed to the carrier frame 1118. The actuator 1126 is operable to transmit a substantially tangential force to the cam ring 1116 through a coupling assembly 1128. For example, the actuator 1126 can include a single rotary motor fixed to the carrier frame 1118 and operably coupled to a radially protruding feature 1142 on the cam ring 1116. The feature 1142 can be fixed to or integrated with the cam ring 1116. Actuation of the rotary motor causes coupling assembly 1128 to extend or retract in a direction substantially tangential to the cam ring 1116. Part of the coupling assembly engages the feature 1142 and causes rotation of the cam ring relative to the carrier frame. In this configuration, the carrier frame 1118 further includes a stop 1144 to limit the motion of coupling assembly 1128 and cam ring 1116. The stop 1144 can be used to prevent excessive strain on the flexible lens membrane element of the liquid lens assembly 1102.

While a rotary motor and screw type linkage are shown, other configurations are also possible. For example, suitable actuators can include stepper motors, servo motors, ultrasonic motors, rotary DC motors, piezoelectric actuators, shape memory alloy actuators, coreless annular flux axial motors, linear ultrasonic motors, rotary ultrasonic motors, other electromechanical actuators, or a combination thereof. Specific examples of different actuation mechanisms are discussed in further detail below. Further, example motors are provided in Appendix A.

Figure 12A:
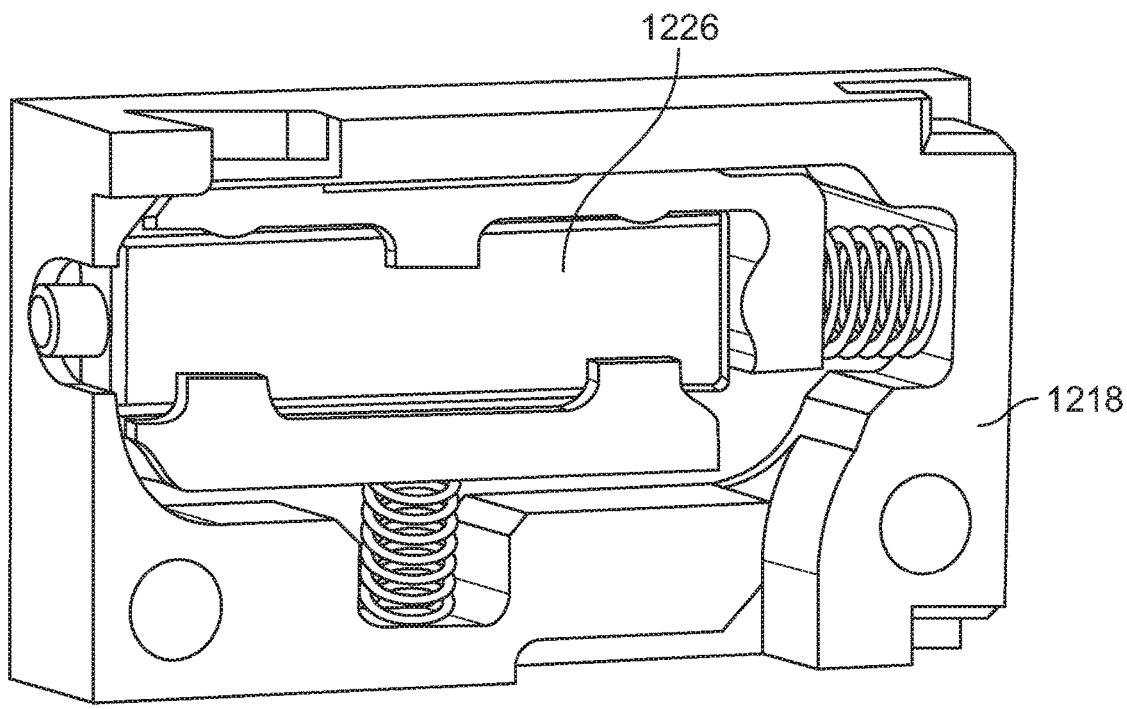
FIGS. 12A and 12B are diagrams of an example actuator.
Figure 12B:
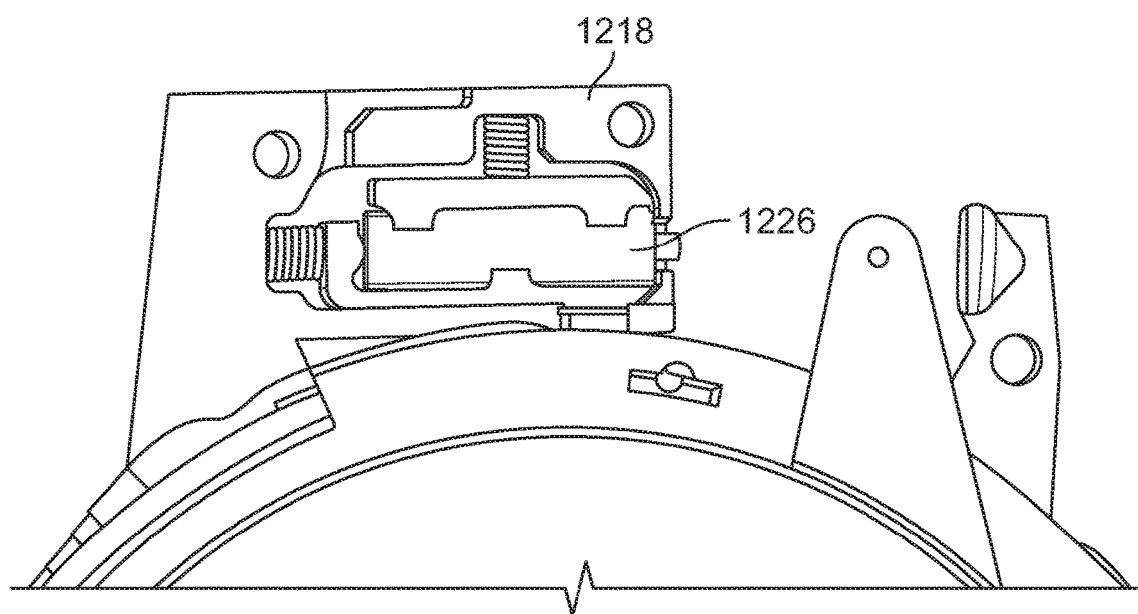

In the example configuration shown in FIG. 11, the actuator 1126 is attached to an outer circumference of the carrier frame 1118. However, other suitable configurations may be employed in various implementations. As an example, FIGS. 12A and 12B show a configuration in which the actuator 1226 is embedded within a radially extended portion of the carrier frame 1218. In the example shown in FIGS. 12A and 12B, the actuator 1226 is a standing wave actuator. The position of the actuator 1226 within the recessed portion 1230 of carrier frame 1218 may be adjustable for calibration. For instance, one or more set screws, spacers, or shims can be used for adjustment in at least one direction. A configuration in which the actuator 1226 is substantially contained within the recessed portion 1230 may provide the advantage of minimizing motion between the actuator 1226 and the carrier frame 1218, such that substantially all motion produced by the actuator is transferred to the driven element. In some implementations, such a configuration can improve efficiency and accuracy of the variable focus assembly adjustment while helping to isolate the variable focus assembly from other components of the augmented reality (AR), virtual reality (VR), mixed reality (MR), and/or types of display systems in which such a variable focus assembly may be mounted. Furthermore, a housing surrounding actuator 1226 can be provided to prevent dust or debris from the actuator from entering the sensitive mechanical and optical components. The housing (not shown) can be made from a material that facilitates the actuator operating at a preferred natural frequency within the variable focus assembly. In some implementations, the preferred natural frequency of the housing can be at least an order of magnitude less than the operation frequency of the actuator 1226. For example, if the operational frequency of the motor is approximately 90 KHz, the preferred natural frequency of the housing can be 9 KHz or less.

When selecting an actuator for a variable focus assembly, sound output of the actuator may also be considered. In some implementations, it may be advantageous for the actuator to operate with low noise output so that noise does not distract from the user experience when assembled in an augment reality (AR) system, virtual reality (VR) system, mixed reality (MR) system, or other display system. As an illustrative example, acceptable sound output of the actuator may be less than 35 dBA, for instance between approximately 25 dBA to approximately 32 dBA. Additionally, in some implementations, it is beneficial for any sound that is produced by the actuators to be at such a frequency that the sound is not detectable by humans and/or sensor devices (e.g., microphones) that may be used in AR systems, VR systems, MR systems, or other display systems. In some implementations, the sound produced by the actuator may be at a frequency above approximately 30 kHz.

In some implementations, the actuator can include a locking mechanism so that the assembly maintains its position when the actuator is not receiving power. As an example, such a locking mechanism can be achieved with a sufficiently high friction force between components within the actuator to prevent motion from occurring, even if there is back force on the actuator from the liquid lens assembly. As another example, mechanical stops, ratchets, augers, or other mechanical features of components within the actuator can be included to provide a locking function of the actuator. In some implementations, a separate lock may be implemented in addition to or instead of the locking feature in the actuator unit; however, such a locking element may increase friction within the moving components of the variable focus assembly. Wear mitigation techniques, such as lubricating the moving components with polytetrafluoroethylene (PFTE), finely machining or polishing interface surfaces, or coating interface surfaces with materials such as diamond-like carbon (DLC) coating, can improve wear characteristics in systems with friction between moving components.

While the use of one actuator per variable focus assembly is discussed above, multiple actuators per variable focus assembly can be used, as discussed in greater detail below.

Coupling

Figure 13A:
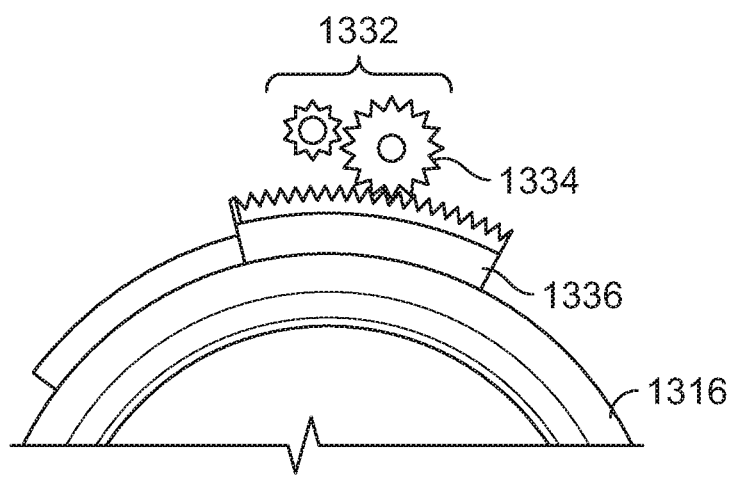
FIGS. 13A-13C are diagrams of example coupling assemblies.
Figure 13B:
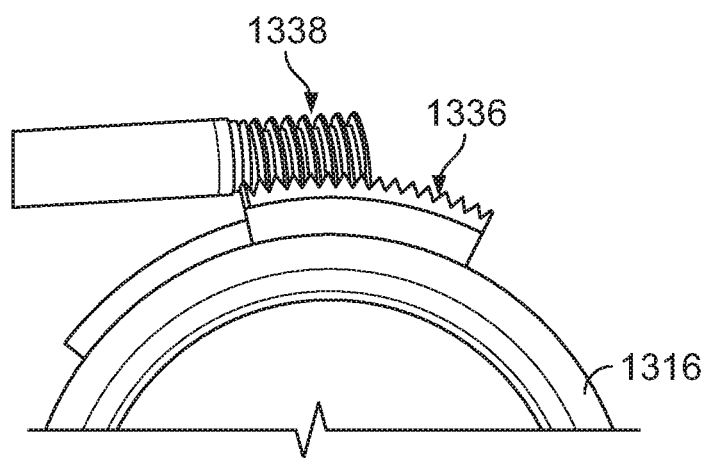
Figure 13C:
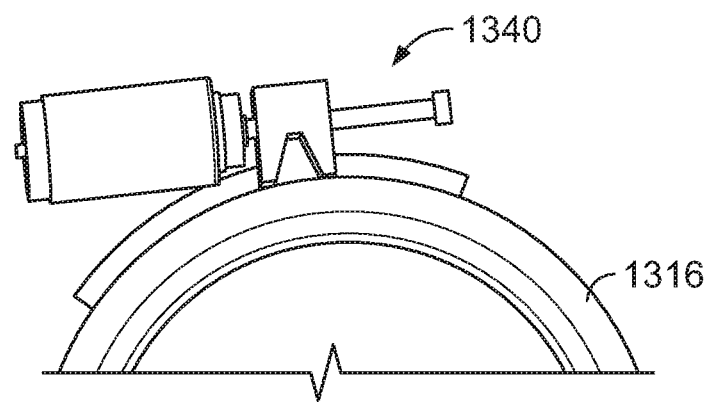

Several variations of coupling assembly configurations can be used to transfer actuator motion to the cam ring. FIGS. 13A-13C show several examples coupling assemblies.

In FIG. 13A, a coupling assembly includes multiple gears 1332 and a pinion drive 1334. The gears 1332 can transfer motion from an actuator (not shown) to a cam ring 1316 through a gear rack 1336 fixed to the cam ring 1316. The cam ring 1316 can be similar to the cam rings described above.

In FIG. 13B, a coupling assembly includes a worm drive 1338 that transfers motion to a cam ring 1316 through a gear rack 1336.

In FIG. 13C, a coupling assembly includes a lead screw and nut assembly 1340 that transfers motion to a cam ring 1316 through a gear rack 1336.

Each of the coupling assemblies can have inner and outer limits so that rotation of the cam ring 1316 is restricted within a particular range. Similarly, stops (not shown) can be included in the system to prevent excessive motion of the cam ring 1316.

In some implementations, coupling assemblies can also include elements or features that reduce irregular or off-axis motion of the actuator and prevent such motions from being transferred to driven elements (e.g., the cam ring). In some implementations, a wobble coupling or a drive dog can be used to decouple wobble motion, parasitic motion, yaw moments, roll moments, and/or pitch moments from the driven element. In some implementations, reducing these moments and motion at the driven element can improve alignment of the cam ring and shaper ring relative to the carrier frame. Further, precise alignment can improve the accuracy of the variable focus assembly and reduce wear on the moving components of the system.

Position Feedback

In some implementations, the focus of the variable focus assembly can be adjusted by precisely controlling the curvature of the flexible lens membrane (e.g., such that a particular focus or optical power is achieved). In some implementations, a closed-loop feedback system can be used to adjust the position of one or more components of the variable focus assembly relative to another (e.g., by controlling the operation of one or more actuators based on one or more position measurements).

In some implementations, a position sensor (e.g., a Hall sensor) can be used to accurately detect the actual positions of one or more moving components in the variable focus assembly. In addition to or instead of a position sensor, an optical encoder can be used to detect the actual positions of one or more moving components within the variable focus assembly. Actual position information from one or more sensors can be sent to a control loop, where a processor (e.g., a microprocessor) compares the actual position data to the expected position of moving components. If a difference between the actual position and the expected position is above a desired threshold, the processor can adjust input to the actuator until the actual position is within a threshold tolerance of the expected position.

Alternative Actuators

Figure 14:
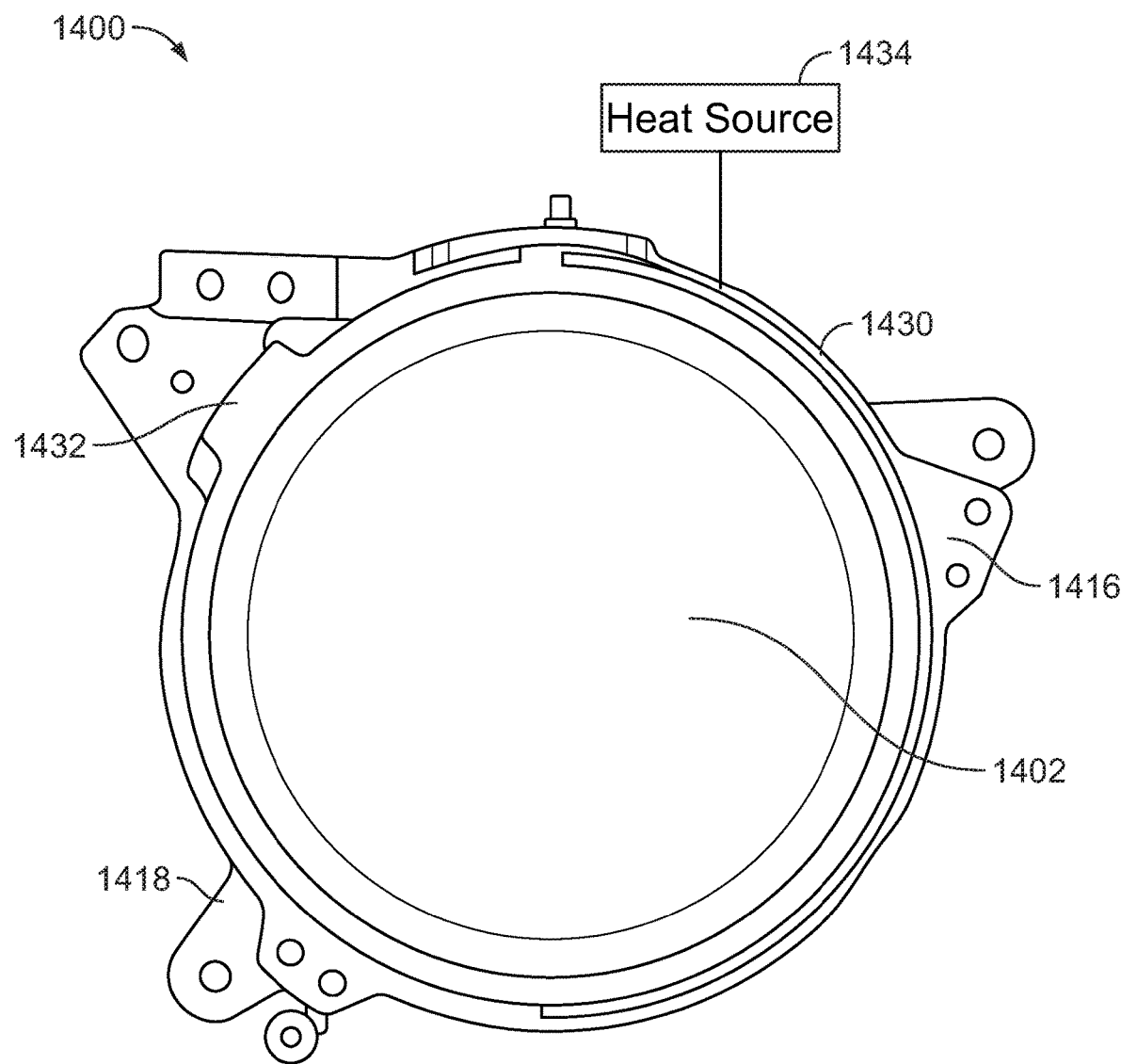
FIG. 14 is a diagram of another variable focus assembly.

FIG. 14 shows another example variable focus assembly 1400. The variable focus assembly 1400 includes a carrier frame 1418, a cam ring 1416, and a liquid lens assembly 1402 similar to the corresponding components described in FIGS. 8, 9, 10A, and 10B.

In the configuration shown in FIG. 14, the variable focus assembly 1400 includes a shape memory alloy (SMA) material actuator 1428 for rotating the cam ring 1416 relative to the carrier frame 1418 and the liquid lens assembly 1402. The actuator 1428 includes a SMA wire 1430, a return spring 1432, and a heat source 1434 thermally coupled to the SMA wire 1430).

The SMA wire 1430 extends circumferentially within a recessed channel on the carrier frame 1418. One end of the SMA wire 1430 is fixed to the carrier frame 1418 and the other end is directly or indirectly coupled to the cam ring 1416. When the SMA wire 1430 is heated (e.g., using the heat source 1434), the length of the SMA wire 1430 decreases such that the end connected to cam ring 1416 moves toward the end connected to carrier frame 1418. Because the movement of the SMA wire 1430 is constrained by the recessed channel, the change in length of the SMA wire 1430 causes the end connected to cam ring 1416 to move toward the end connected to carrier frame 1418, thereby rotating cam ring 1416 relative to the carrier frame 1418. When the SMA wire 1430 cools, it expands to its original length and causes the cam ring 1416 to rotate back to its original position. By controlling the temperature of the SMA wire 1430, the amount of motion between the cam ring 1416 and the carrier frame 1418 can be controlled to finely adjust the curvature of the flexible membrane and fluid chamber of the liquid lens assembly 1402. In some implementations, the return spring 1432 can bias the cam ring 1416, such that it returns to its original position relative to the carrier frame 1418 when the SMA wire 1430 is lengthened (e.g., when the SMA wire cools).

In some implementations, the SMA wire 1430 can be composed, at least in part, of copper-aluminum-nickel and/or nickel-titanium (NiTi). In some implementations, the SMA wire 1430 can be composed of an alloy of zinc, copper, gold and iron.

Figure 15A:
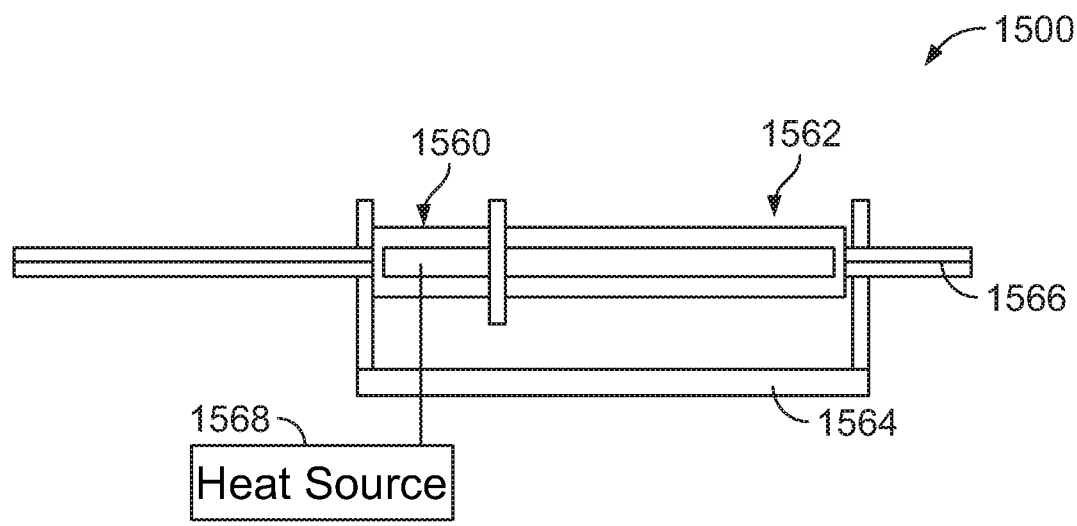
FIGS. 15A and 15B are diagrams of an example shape memory alloy actuator.
Figure 15B:
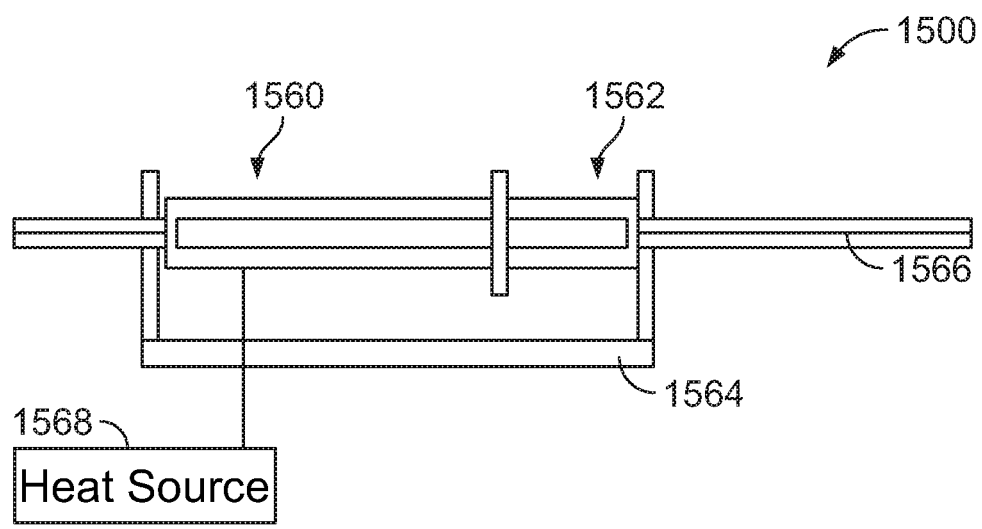

FIGS. 15A and 15B show another example SMA actuator 1500. In this example, the actuator 1500 includes a SMA spring 1560 opposed by a bias spring 1562. The SMA spring 1560 and bias spring 1562 are housed within a frame 1564 that limits the total length of the SMA spring and bias spring assembly. The frame 1564 includes a hole for a linkage wire 1566 to enter the frame 1564 and connect to at least one of the SMA spring 1560 and the bias spring 1562. The activation state of the SMA spring 1560 can be control by applying heat to the SMA spring 1560 (e.g., by a heat source 1568 thermally coupled to the SMA spring 1560) or cooling the SMA spring 1560. Actuation of the SMA spring 1560 causes elongation of the SMA spring 1560 and a contraction of the bias spring 1562. Linkage wire 1556 is shifted as the SMA spring 1560 actuates and is operable to transfer force to a driven component (e.g., a cam ring or other drive component coupled to the linkage wire 1566).

Figure 16A:
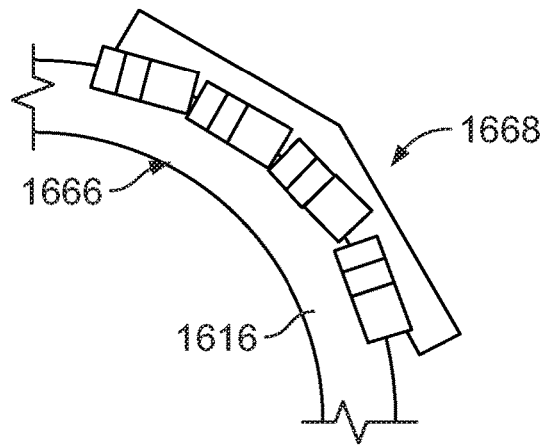
FIGS. 16A-16C are diagrams of example coreless annular flux permanent magnet axial motors.
Figure 16B:
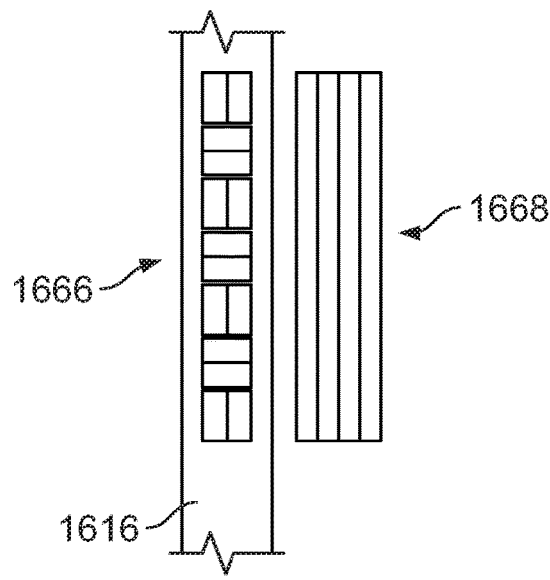
Figure 16C:
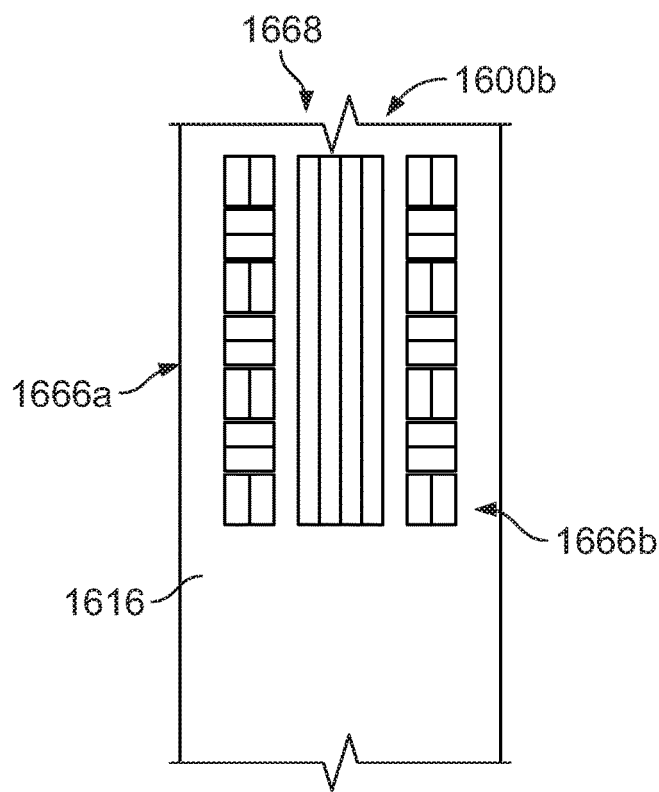

FIGS. 16A and 16B show another example actuator 1600a configured to adjust a variable focus assembly (e.g., one or more of the variable focus assemblies described herein). FIG. 16A shows the actuator 1600a according to a side (axial) view, and FIG. 16B shows the actuator 1600a according to an side (axial) view in which the components of the actuator 1600a have been "unfolded" into a linear configuration for illustrative purposes.

The actuator 1600a is a coreless annular flux permanent magnet axial motor that includes permanent magnets 1666 placed in a particular arrangement around at least a portion of the annular opening of either a cam ring 1616 or the carrier frame (not shown in FIGS. 16A and 16B) of a variable focus assembly. The motor further includes electrical windings 1668 placed around at least a portion of the annular opening of the carrier frame or the cam ring 1616 so that the permanent magnets 1666 and electrical windings 1668 are mounted to separate components.

The electrical windings 1668 can be made using conductive material printed on printed circuit board (PCB). The PCB can then be cut to size and mounted to the carrier frame or cam ring 1616. In some implementations, multiple layers of the PCB can be stacked on top of each other, each layer having printed windings, so that the density of the windings is increased. Higher density of windings can provide higher torque output.

As electrical current passes through the PCB windings, a magnetic field is created that interacts with the permanent magnet array to cause relative rotation between the cam ring and the carrier frame.

FIG. 16B shows a variation of the coreless annular flux permanent magnet axial motor of FIG. 16A. The motor 1600*b* shown in FIG. 16B includes a second set of permanent magnets 1666*b* such that the PCB windings 1668 are between a first set of permanent magnets 1666*a* and a second set of permanent magnets 1666*b*. By sandwiching the PCB windings 1668 between two sets of permanent magnets, a stronger and more uniform flux density is achieved. In some implementations, the permanent magnets 1666*a* and 1666*b* can be arranged in a Halbach array.

Figure 17:
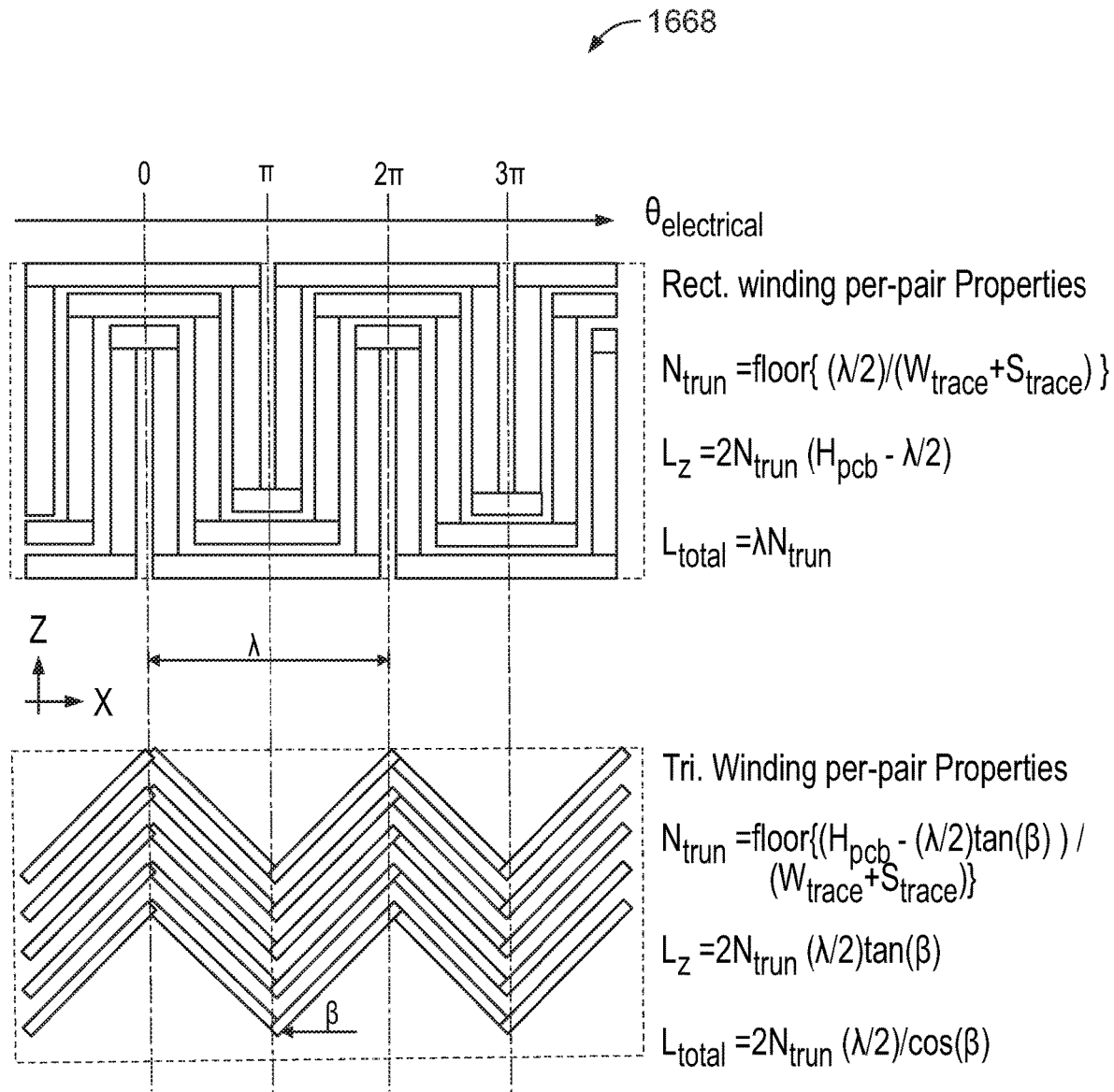
FIGS. 17 and 18 are diagrams of example printed windings for coreless annular flux permanent magnet axial motor.
Figure 18:
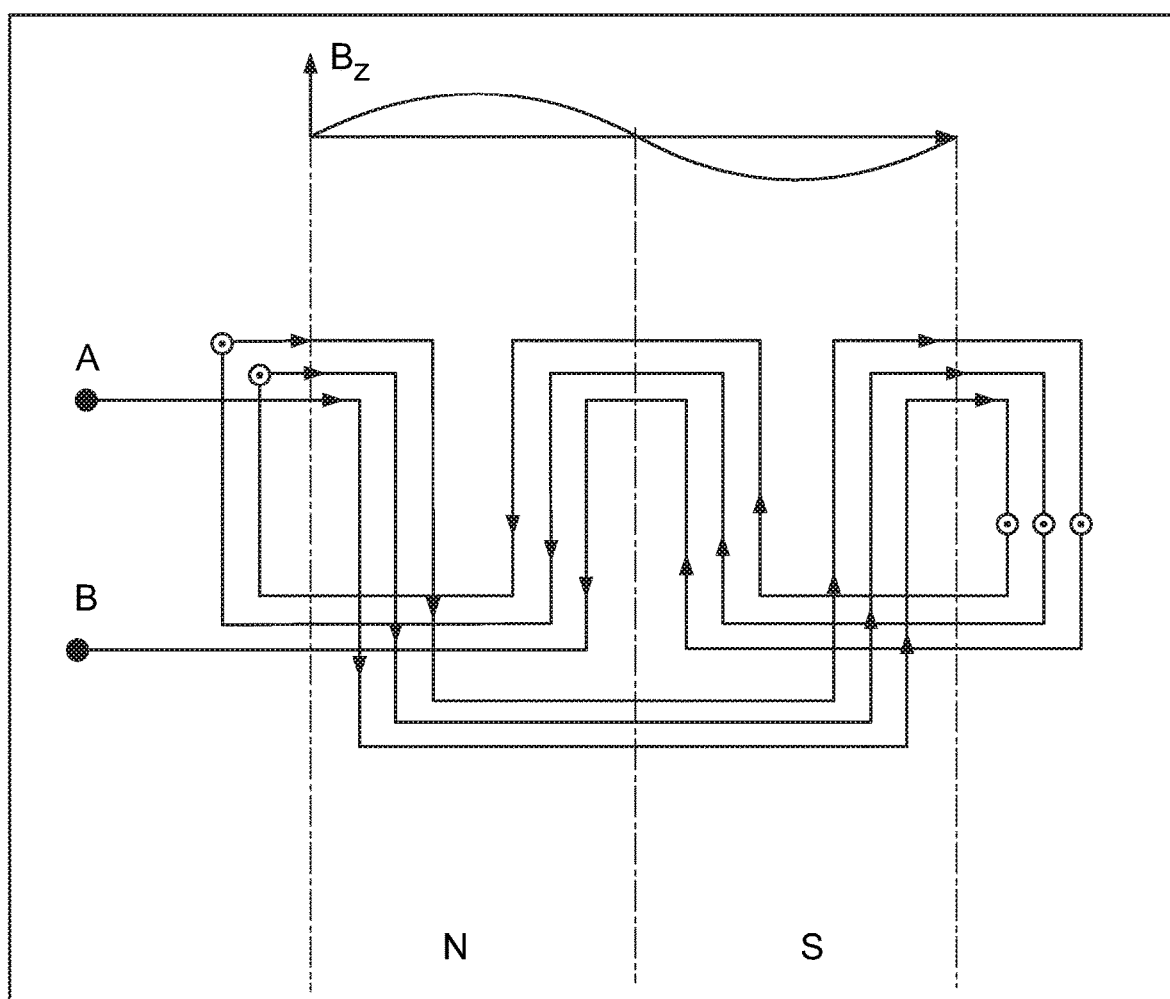

Example patterns of printed windings 1668 are shown in FIGS. 17 and 18.

Perimetric Frame Configuration

Figure 4A:
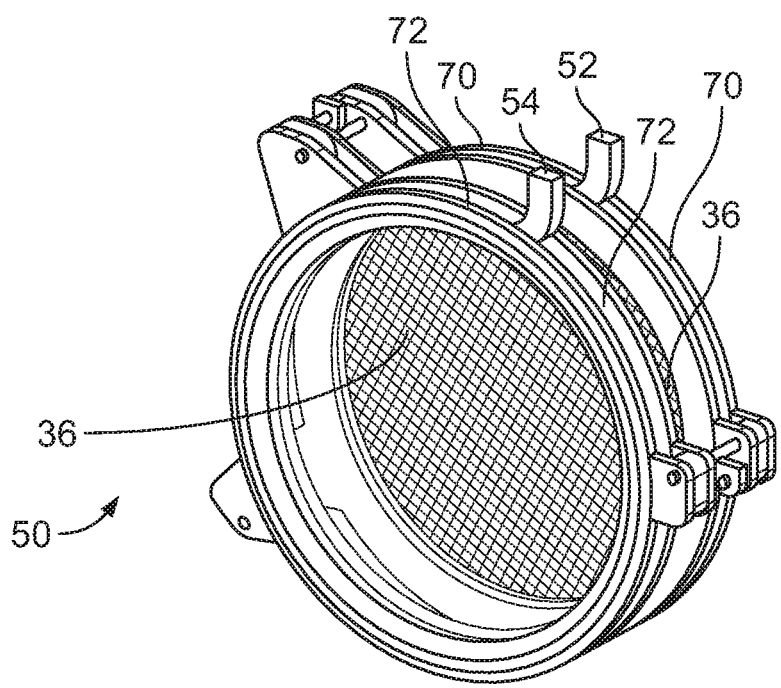
FIGS. 4A and 4B are diagrams of another example variable focus assembly.
Figure 4B:
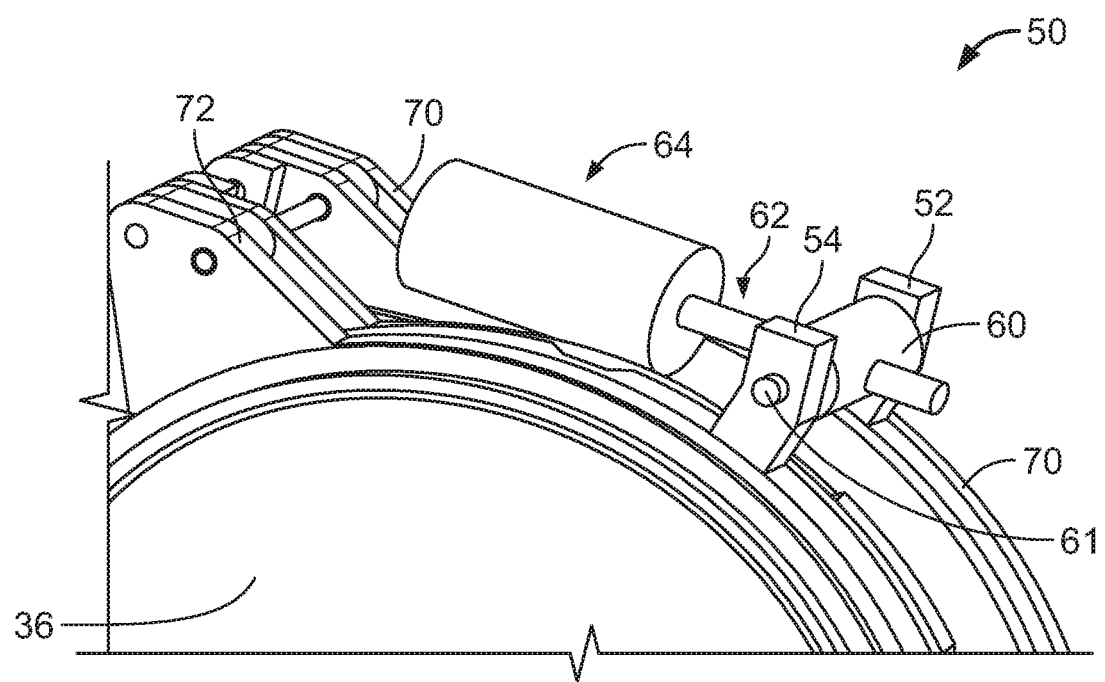

FIGS. 4A and 4B show an example variable focus assembly 50 having a perimetric frame configuration. The variable focus assembly 50 includes a fluid/membrane lens 36 interposed between two rigid perimetric frame members 70 and 72. Further, rotatable adjustment perimetric member 52 and 54 are disposed between the fluid/membrane lens 36 and each of the rigid perimetric frame members 70 and 72.

The actuation motor 64 adjustment perimetric members 52 and 54 can be rotatably adjusted relative to the rigid perimetric frame members 70 and 72 using a compact actuation motor 64 (e.g., a stepper motor, servo motor, ultrasonic motor, or other electromechanical actuator). As shown in FIG. 4B, the actuation motor 64 can be coupled to the rigid perimetric frame members 56 and 58 and to the rotatable adjustment perimetric members 52 and 54 using a coupling assembly having a shaft 62 coupled to a barrel member 60 which is coupled to a pin 61 that interfaces with the rotatable adjustment perimetric members 52 and 54.

The mechanical interface between the rotatable adjustment perimetric members 52 and 54 and the rigid perimetric frame members 70 and 72 can one or more include perimetrically located features (e.g., such as ramps, bumps, or step-ups) that cause the inter-coupled fluid/membrane lens 36 to be squeezed or loosened with a substantially even perimetric loading, such as by three or more interfacial feature groupings (e.g., one at every 120 degrees around the 360 degree perimetric interfaces between the rotatable adjustment perimetric members 52 and 54 and the rigid perimetric frame members 70 and 72. In other words, the fluid/membrane lens 36 can be loosened or tightened relatively evenly, preferably without substantial movement or reorientation of the image position relative to the plane of the lens.

Axial Drive Configuration

FIGS. 5, 6, 7A and 7B show other example configurations for providing substantially even perimetric loading (and thus focus adjustment without substantial movement or reorientation of image position) for a compact variable focus assembly having an inter-coupled fluid/membrane lens 36.

Figure 5:
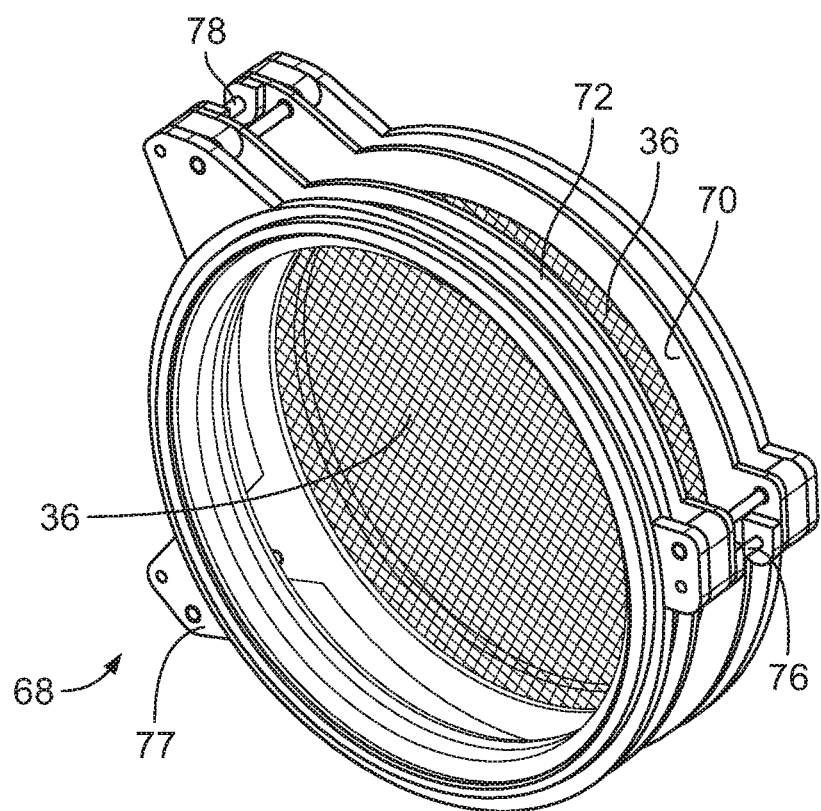
FIGS. 5, 6, 7A, and 7B are diagrams of additional example variable focus assemblies.

As shown in FIG. 5, an example compact variable focus assembly 68 includes two rigid perimetric frame members 70 and 72 and an inter-coupled fluid/membrane lens 36. Substantially even perimetric loading of the fluid/membrane lens 36 is provided by several electromagnetic actuators 76, 77, and 78, which are configured to controllably urge or repel the two rigid perimetric frame members 70 and 72 relative to each other to provide controllable focal adjustment. In some implementations, the electromagnetic actuators 76, 77, and 78 can be placed equidistantly from each other perimetrically (e.g., about 120 degrees from each other) to provide even loading with a 3-actuator configuration. Other implementations can include more actuators, such as four actuators at 90 degrees apart, etc.

Figure 6:
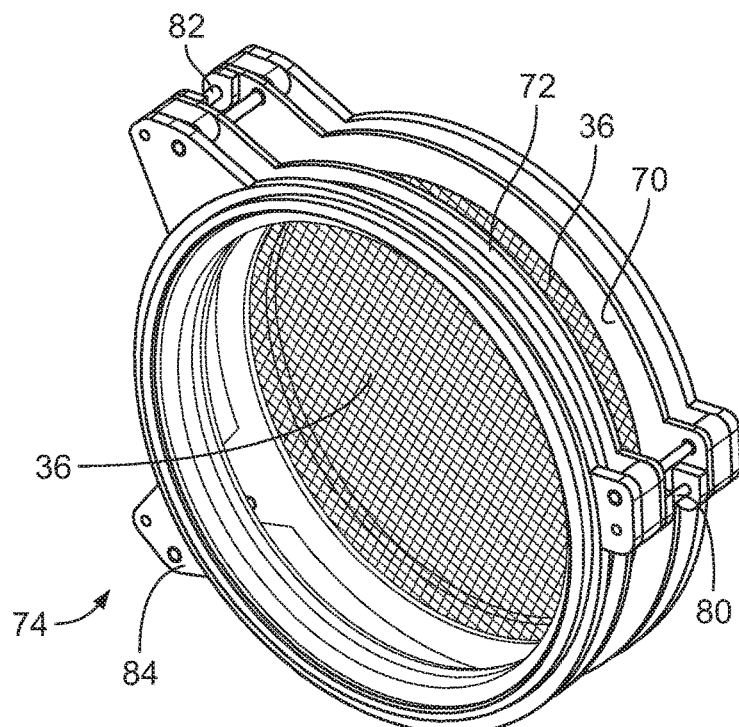

As shown in FIG. 6, another example compact variable focus assembly 74 includes two rigid perimetric frame members 70 and 72 and an inter-coupled fluid/membrane lens 36. Substantially even perimetric loading of the fluid/membrane lens 36 is provided by several shape memory metal alloy actuators 80, 82, and 84, which are configured to controllably urge or repel the two rigid perimetric frame members 70 and 72 relative to each other to provide controllable focal adjustment. In some implementations, the shape memory metal alloy actuators 80, 82, and 84 can be placed equidistantly from each other perimetrically (e.g., about 120 degrees from each other) to provide even loading with a 3-actuator configuration. Other implementations can include more actuators, such as four actuators at 90 degrees apart, etc.

Figure 7A:
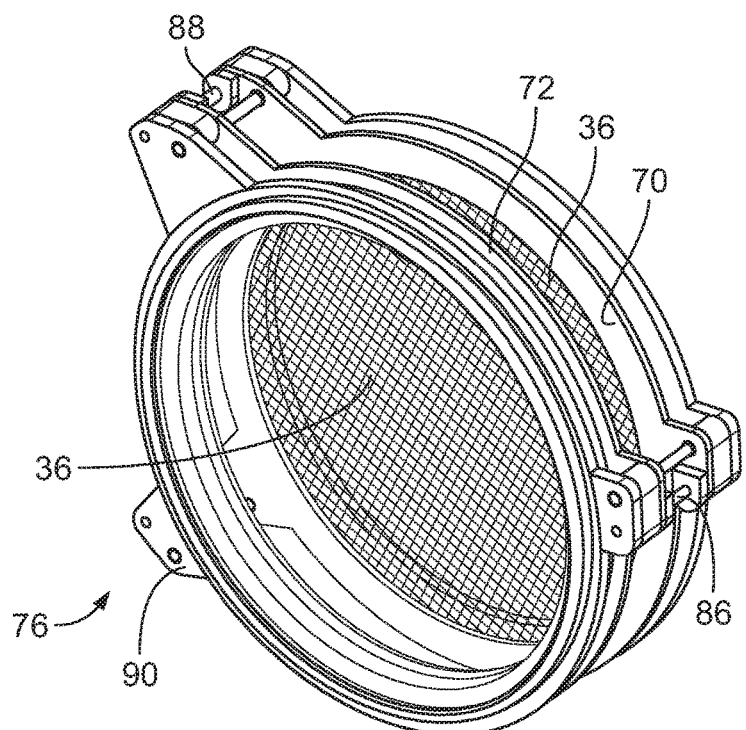
Figure 7B:
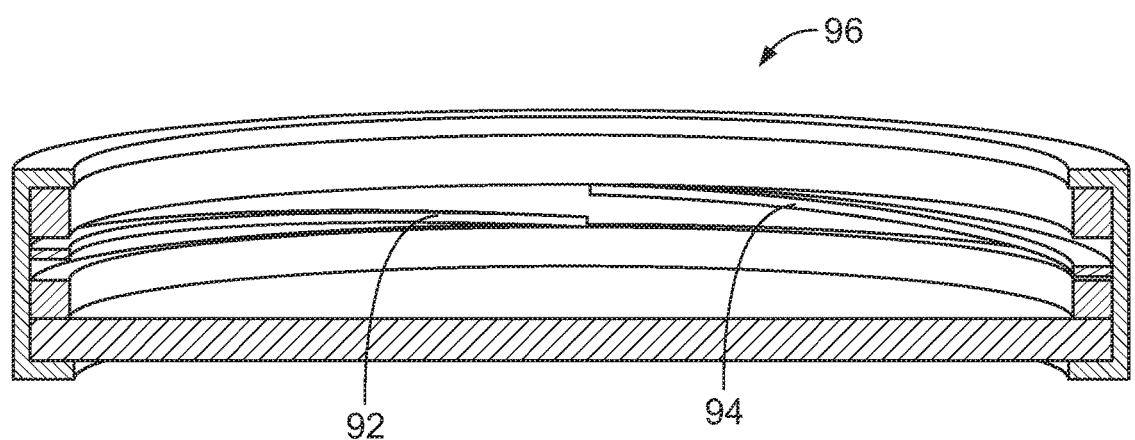

As shown in FIGS. 7A and 7B, another example compact variable focus assembly 76 includes two rigid perimetric frame members 70 and 72 and an inter-coupled fluid/membrane lens 36. Substantially even perimetric loading of the fluid/membrane lens 36 is provided by several piezoelectric actuators 86, 88, and 90, which are configured to controllably urge or repel the two rigid perimetric frame members 70 and 72 relative to each other to provide controllable focal adjustment. In some implementations, the piezoelectric actuators 80, 82, and 84 can be placed equidistantly from each other perimetrically (e.g., about 120 degrees from each other) to provide even loading with a 3-actuator configuration. Other implementations can include more actuators, such as four actuators at 90 degrees apart, etc. Referring to FIG. 7B, depending upon how much mechanical throw is needed in each of the piezoelectric actuators for a given variable focus lens configuration, each of the piezoelectric actuators can include an assembly of a series of individual piezoelectric devices (e.g., 92, 94, etc.) that are inter-coupled such that activation of each provides a given mechanical throw which is added to others in the assembly to produce an overall assembly throw which is suitable for the application.

Single Actuator Axial Drive Configurations

The variable focus assemblies shown in FIGS. 5-7 can include several actuators around the circumference of the assembly. In some implementations, it may be advantageous to reduce the number of actuators used (e.g., in order to reduce size, weight, and power requirements of the variable focus assembly).

Figure 19:
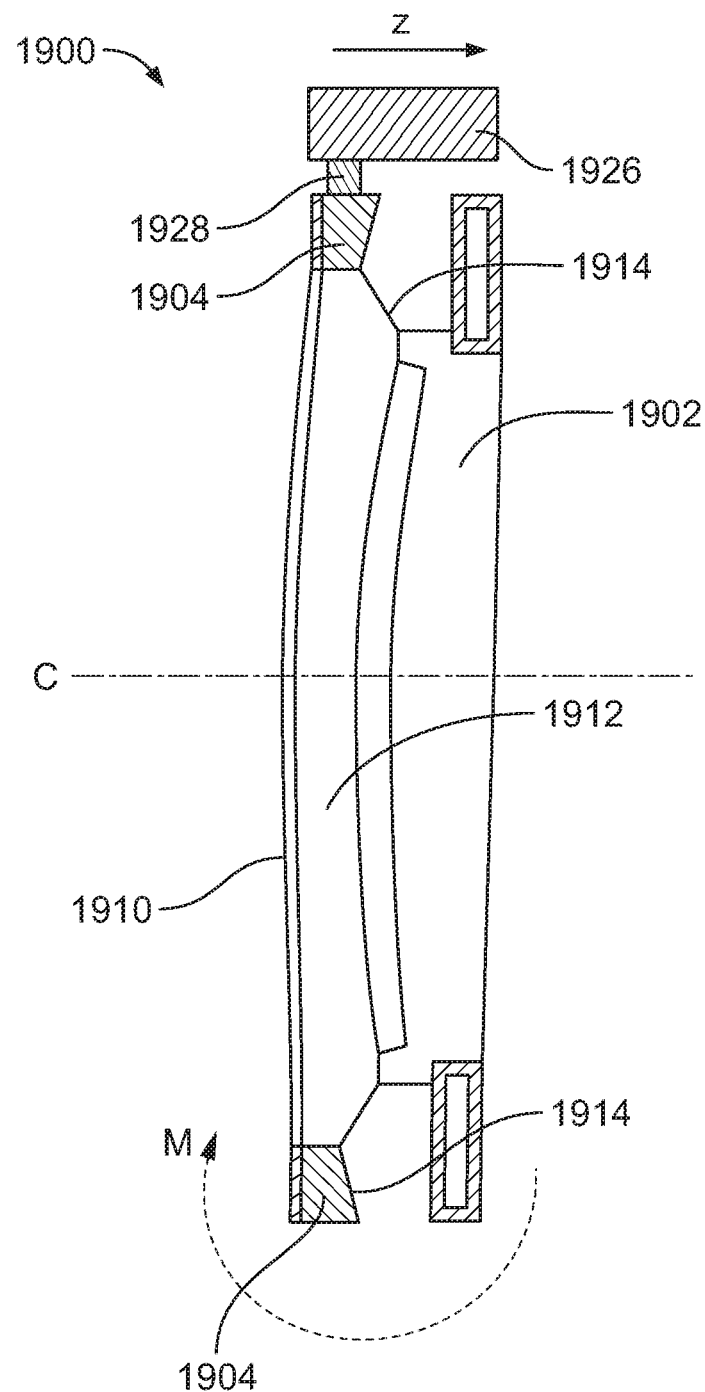
FIG. 19 is a diagram of another example variable focus assembly.

FIG. 19 shows another example variable focus assembly 1900 having a single actuator 1926. In some implementations, the actuator 1926 can be a linear ultrasonic motor that is connected to a shaper ring 1904 by a linkage 1928. The actuator 1926 causes the linkage 1928 and the shaper ring 1904 to move axially toward and away from the fixed refractive component 1902, which causes a change in curvature of flexible lens membrane 1910 and the shape of fluid compartment 1912. In alternate configurations, the refractive component can be moved toward and away from a fixed shaper ring.

In some implementations, the variable focus assembly 1900 can include an annular membrane 1914 that is flexible to allow axial motion between the refractive component 1902 and the shaper ring 1904. However, as shown in FIG. 19, this flexibility can also cause a moment, M, on the shaper ring 1904 when the linkage 1928 is moving in the z direction. The moment, M, can cause the shaper ring 1904 and the flexible lens membrane 1910 attached to the shaper ring to tilt, such that the curvature of flexible lens membrane 1910 is no longer symmetric about the central axis, C. As a result, light passing through the asymmetric curvature may become distorted.

Figure 20A:
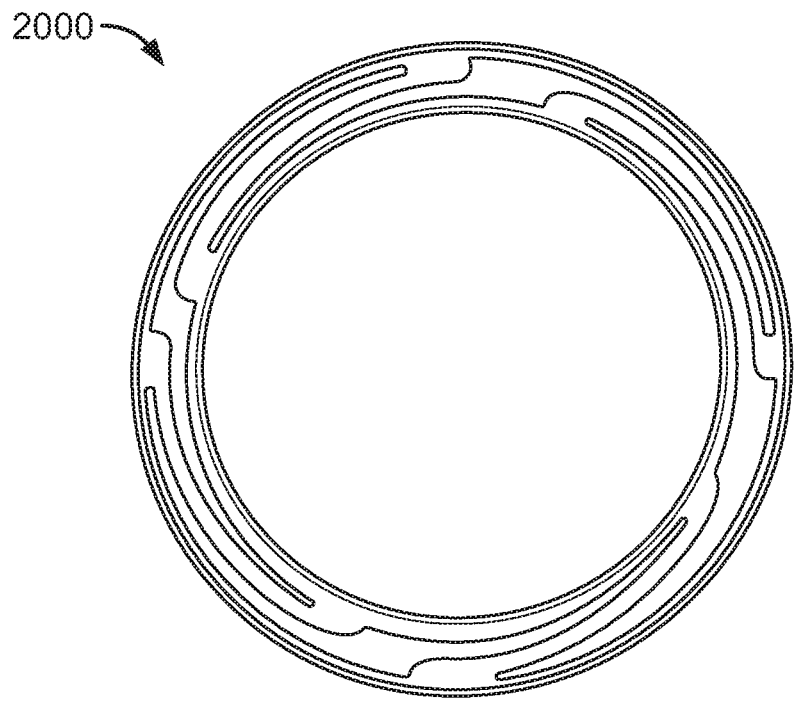
FIG. 20A is a diagram of an example annular flexure ring.
Figure 20B:
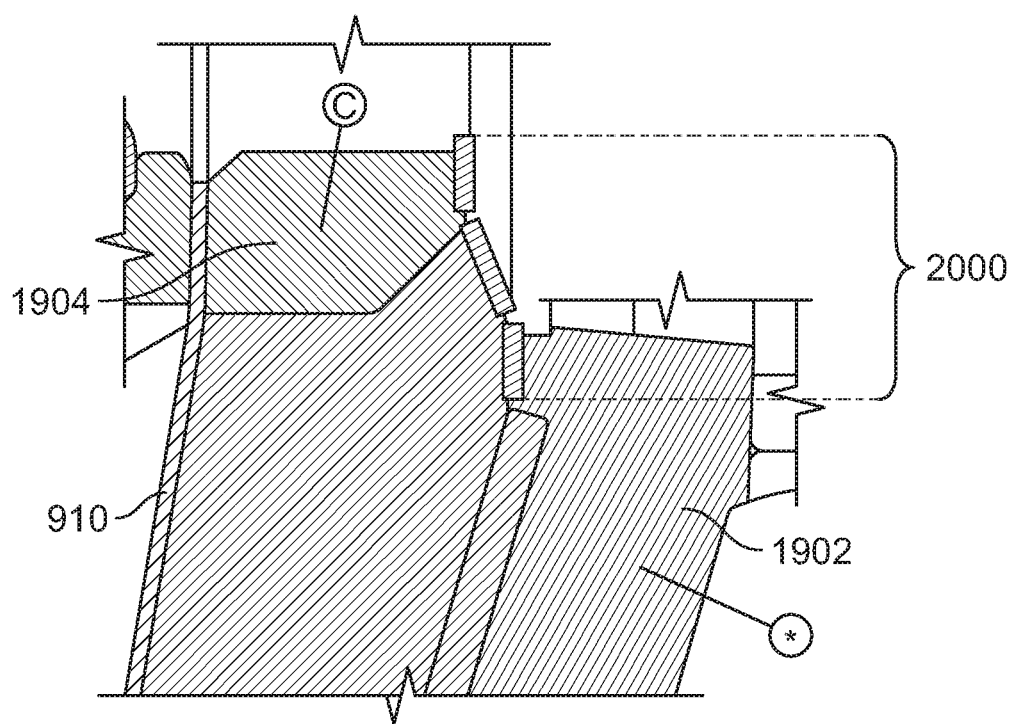
FIG. 20B is a diagram of an example variable focus assembly including an annular flexure ring.

This distortion can be eliminated or otherwise reduced using an annular flexure ring. For example, FIG. 20A shows a top view of an example annular flexure ring 2000. The annular flexure ring 2000 can be included in the variable focus assembly to support and reinforce the annular membrane 1914, as shown in the assembly cross section view of FIG. 20B. Outer portions of the annular flexure ring 2000 can be fixed to the shaper ring 1904, while inner portions of the annular flexure ring 2000 can be fixed to the refractive component 1902. The annular flexure ring 2000 can be made from a rigid material such as metal (aluminum, steel, or titanium), plastic, or other suitable material. Further, the annular flexure ring 2000 can include slots that allow the annular flexure ring 2000 to change shape in a radial direction in response to the axial load applied to it as the linkage 1928 moves the shaper ring 1904. The rigidity of the annular flexure ring 2000 reduces the moment M such that a single actuator configuration can maintain a symmetric curvature of flexible lens membrane 1910 over a range of positions.

Use in a Display System

Figure 21:
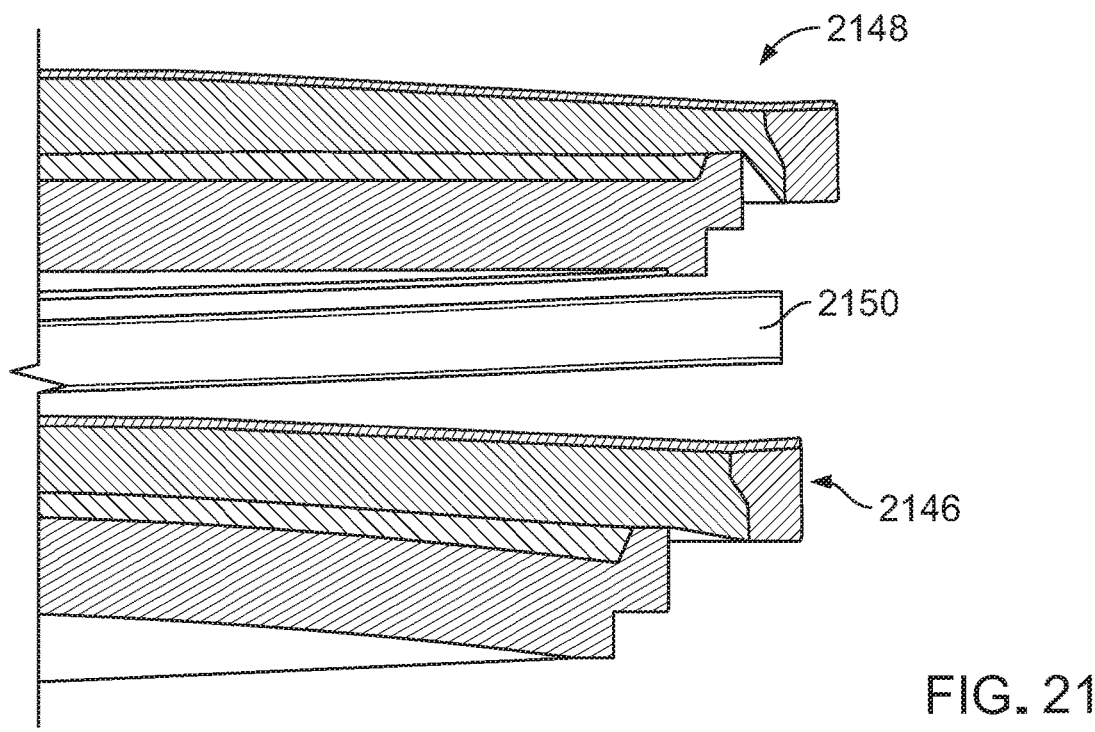
FIG. 21 is a diagram showing a partial cross-sectional view of a pair of variable focus assemblies for use in a display system.

Pairs of variable focus assemblies, such as an inner lens assembly (ILA) and an outer lens assembly (OLA) can be used in a display system (e.g., AR system, MR system, etc.), to impart one of a range of focal depths to virtual content using the ILA while correcting or compensating for distorted environmental light using the OLA. FIG. 21 shows a partial cross-sectional view of a pair of variable focus assemblies 2146 and 2148 with an augmented reality eyepiece 2150 in between. The ILA 2146 and the OLA 2148 are disposed on either side of the eyepiece 2150. Virtual images from the eyepiece 1250 are projected toward the ILA 2146, and are shaped by the ILA 2146 before being emitted towards the user. Light from the surrounding environment is shaped a first time by the OLA 2148 and is shaped a second time by the ILA 2146, such that the net change in focus of the environmental light is zero after the two shaping events (e.g., the optical power of the OLA 2148 is the inverse of the optical power of the ILA 2146).

In some implementations, the optical powers of the OLA 2148 and the ILA 2146 can be adjusted by a control module (e.g., a computing system having one or more computer processors) during operation of the display system. For example, a control module can control one or more of the actuator modules of the display system to selectively adjust the optical power of the ILA 2146 (e.g., such that virtual images from the eyepiece 1250 are presented to user according to one or more selected focal planes). Further, the control module can concurrently control the actuator modules to adjust the optical power of the OLA 2148, such that the optical power of the OLA 2148 is the inverse of the optical power of the ILA 2146 (e.g., to correct or compensate for distorted environmental light by the ILA 2146). In some implementations, the control module can be included in one or more of the display system (e.g., the head-worn viewing component 2, the hand-held controller component 4, and/or the interconnected auxiliary computing or controller component 6).

In some implementations, the diameter of the OLA 2148 can be larger than that of the ILA 2146. Example specifications of the ILA 2146 and the OLA 2148 are provided in Appendix B and Appendix C, respectively.

Each of the ILA 2146 and the OLA 2148 can be implemented as any of the variable focus assemblies described herein. Further, each of the ILA 2146 and the OLA 2148 can be actuated using any of the actuation configurations described herein.

Coupled Variable Focus Lens Assembly Configurations

Figure 25:
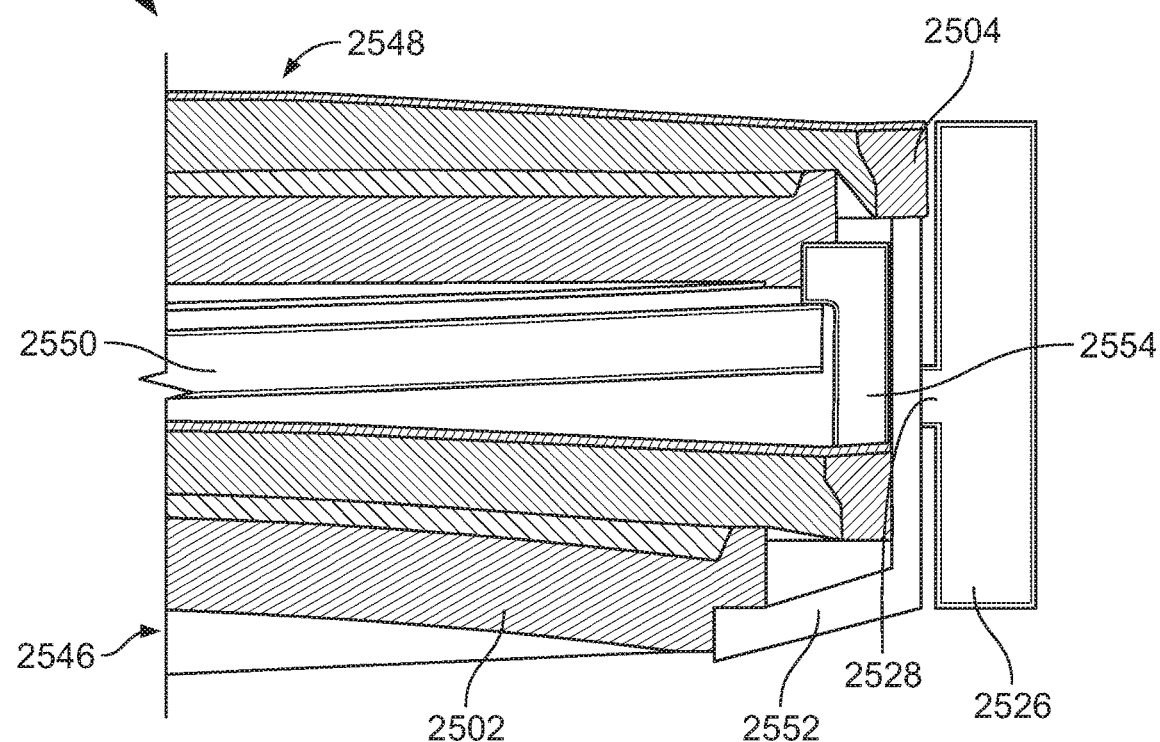
FIG. 25 is a diagram showing a partial cross-sectional view of a pair of variable focus assemblies for use in a display system.

As discussed above, in some implementations, it may be advantageous to reduce the number of actuators in a variable focus assembly. This may also be true for systems having more than one variable focus assembly. FIG. 25 is a cross-sectional view of an example system 2500 having a pair of variable focus assemblies similar to the configuration shown in FIG. 21. The system 2500 couples the moving component of ILA 2546 to the moving component of OLA 2548 so that both moving components can be driven by one or more common actuator(s) 2526 and a common linkage 2528. In some implementations, the common actuator 2526 can be a linear ultrasonic motor.

In the example shown, the moving component of the ILA 2246 is the ILA refractive component 2502 and the moving component of the OLA 2248 is the OLA shaper ring 2504. However, it is also possible to couple and move both the OLA refractive and the ILA shaper. While a flexure ring similar to that shown in FIG. 20A is not shown in the ILA 2246 or the OLA 2248, such flexure rings can be used to reduce moments on the ILA and OLA moving components.

Gain Compensation

In implementations where the OLA diameter is larger than the ILA diameter, the OLA assembly travels a different axial distance than the ILA assembly in order for the net diopter change of environmental light traveling through both the OLA and ILA assemblies to equal zero. Various spring forces can be added into the system (e.g., by the flexible lens membrane of one or more of the ILA and the OLA) to drive both moving components at a different rate. Specifically, a spring force can be added to the drive linkage for the lens requiring less travel.

Athermalization

An additional calibration consideration for a coupled system 2500 is compensation for optical changes caused by thermal drift. One component of thermal drift is the expansion of the optical fluid within the liquid lens assemblies when exposed to heat. Expansion of the fluid increases the curvature of the flexible lens membrane and increases optical power imparted by the fluid lens. Another component of thermal drift in optical system 2500 is the expansion of support elements, such as the linkage 2552 and the ground element 2554. For example, as the ground element 2254 expands, it compresses the OLA refractive component toward the OLA shaper ring and compresses the ILA shaper ring toward the ILA refractive component. Thus, expansion of the ground element 2254 also increases the optical power of the OLA and the ILA. In some implementations, the optical power change at the ILA can cause virtual images to appear at a different focal depth than intended. Further, the optical power change at the OLA does not typically correspond exactly to the optical power change at the ILA. As a result, environmental light passing through the OLA and ILA can appear defocused.

To compensate for the additional optical power at the OLA and ILA caused by thermal drift, the material of the linkage 2252 can be selected to have a particular coefficient of thermal expansion (CTE) to balance the system. Specifically, the CTE of linkage 2252 can be selected such that it allows a sufficient degree of material expansion to maintain a predicted relative position between the shaper and refractive components of both the ILA and the OLA (e.g., such that the rigid refractive component of the ILA and the shaper ring of the OLA due to the variation in the temperature is less than a threshold value within a particular temperature range). For example, the linkage 2252 can be formed from a polymer having a relatively high coefficient of thermal expansion. When the linkage 2252 is exposed to the same thermal conditions as the optical fluid and ground element 2254, the linkage 2252 expands to reduce compression of the OLA refractive against the OLA shaper and to reduce compression of the ILA refractive with respect to the ILA shaper.

In some implementations, the threshold value can be 0.01 mm or less, 0.1 mm or less, 1 mm or less, or some other threshold value. In some implementations, the temperature range can be the expected operating temperature range of the device. As an example, the lower bound of the temperature range could be −20° C., −10° C., 0° C., 10° C., 20° C., 30° C., 40° C., 50° C., or some other temperature. As another example, the higher bound of the temperature range could be 20° C., 30° C., 40° C., 50° C., 60° C., 70° C., 80° C., 90° C., 100° C., 110° C., 120° C., 130° C., or some other temperature.

Linear Ultrasonic Actuator with Multiple Vibrational Modes

In some implementations, the actuator(s) employed in the variable focus assembly can include one or more actuators that each has multiple vibrational modes. Simultaneous excitation of the multiple vibrational modes of the actuator can lead to a compound vibration of the actuator to enable control of the components of the variable focus assembly.

Figure 22:
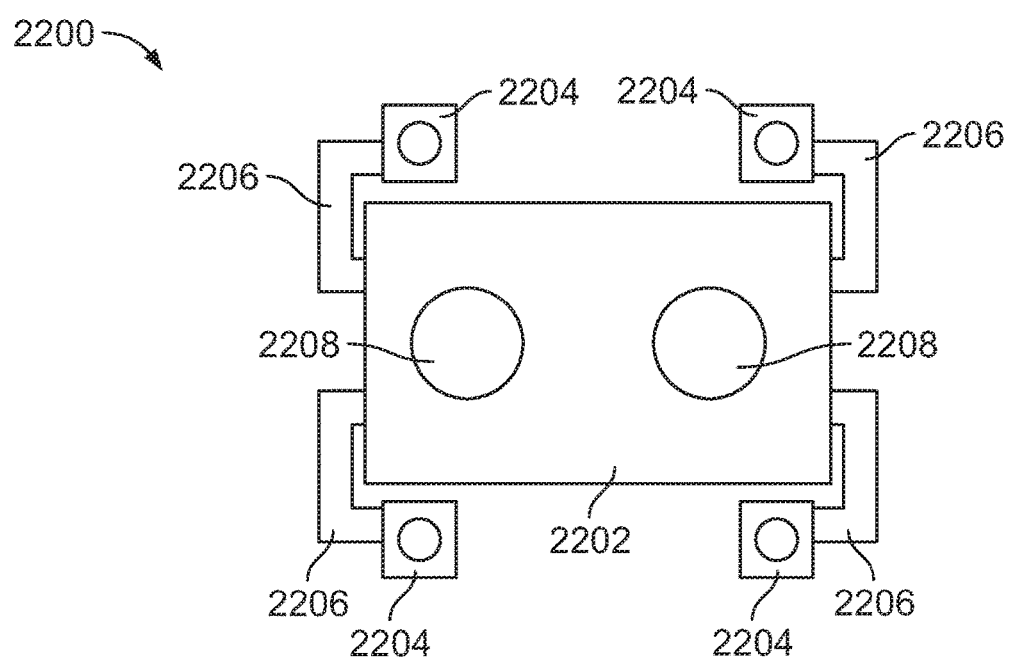
FIGS. 22, 23, 24A, and 24B are diagrams of an example active element of an actuator having multiple vibrational modes.

FIG. 22 shows an example schematic of an active element of an actuator having multiple vibrational modes, which can be employed in a variable focus assembly in some embodiments. The actuator can also be described as a traveling wave ultrasonic motor with multiple modes. The actuator can be a linear driving type of actuator, and can be referred to as a linear actuator or linear motor. The active element 2200 can include a plate 2202 composed at least party of a piezoelectric material (e.g., a ceramic). Coupling components 2204 can be attached to the plate 2202 (e.g., secured directly onto plate 2202) using attachment arms 2206. The coupling components 2204 can be attached to fixed points (e.g., mechanical ground) in the variable focus assembly (e.g., one or more points on the shaper ring, cam ring, carrier frame, etc.). The attachment arms 2206 can be articulated into multiple segments, as in the example shown, at least in part to reduce the length of the actuator. The components 2208 can be coupled to components of the variable focus assembly, such as lens surfaces. Overall linear movement of the components 2208 relative to each other during operation of the actuator can cause the relative movement of the attached variable focus assembly components. FIG. 22 shows example dimensions (in mm) of components of the active element 2200. Some implementations employ different suitable values for the illustrated dimensions.

Figure 23:
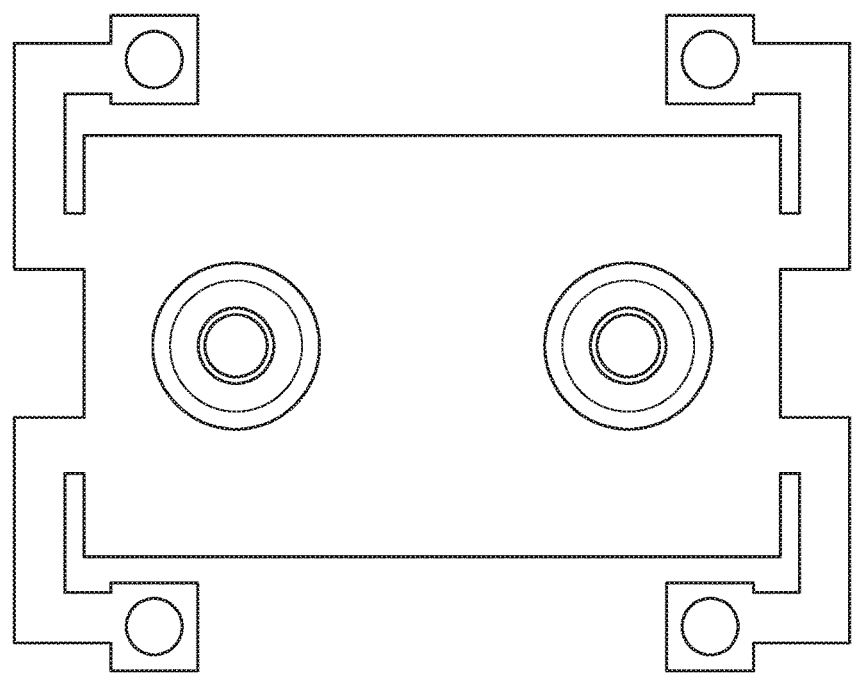
Figure 24A:
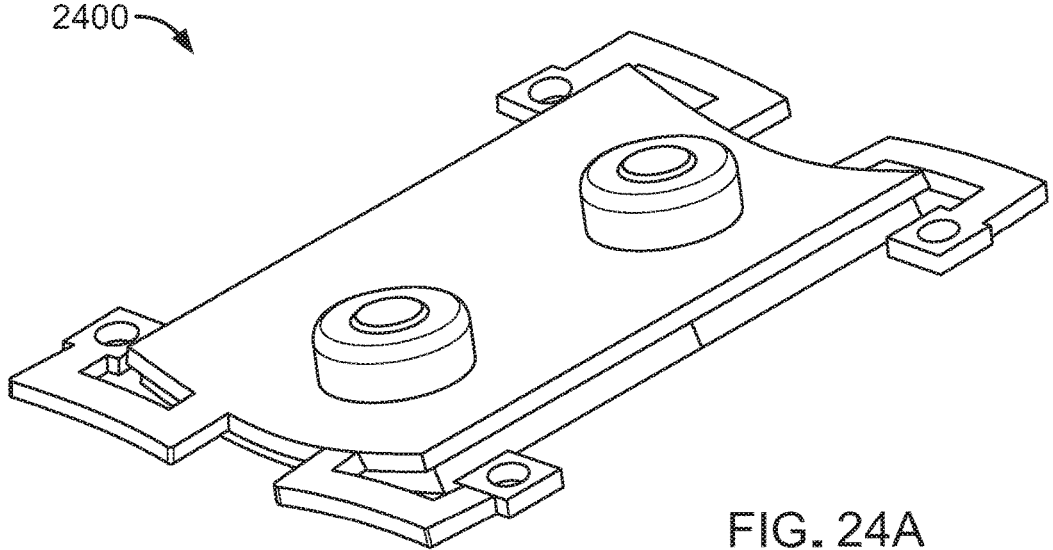
Figure 24B:
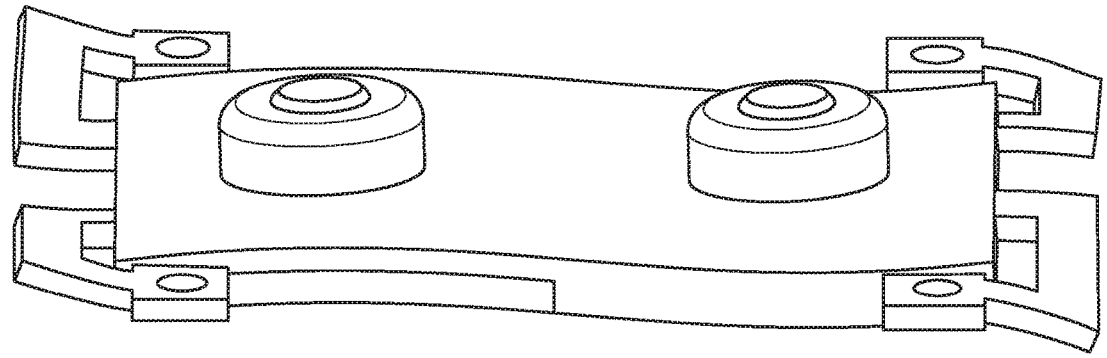

FIG. 23 shows an example schematic 2300 of a top-down view of the active element 2200 of the actuator. FIGS. 24A and 24B show respective example schematics 2400 and 2402 of the active element 2200. FIG. 24A illustrates a first mode of vibration (e.g., a "cylinder" or "pipe" mode) in which the long edges of the active element are displaced up and down in the z-direction relative to the components 2208. FIG. 24B illustrates a second mode of vibration (e.g., a "sinusoidal" mode) in which the short edges of the active element are displaced along the y-direction, in opposite directions from one another.

In some implementations, the active element can be configured such that its overall length (e.g., 11.63 mm in the example shown in FIG. 22) is sufficiently short to enable use of the actuator in the variable focus assembly, which may be limited in its available maximum depth or clearance when employed in a head-worn viewing component of a display system such as a VR system, an AR system, a MR system, or other type of system. The active element 2200 can be configured such that the natural frequencies of the multiple (e.g., two) fundamental vibrational modes of the active element 2200 are the same or sufficiently close to one another. This consideration provides for efficient operation of the actuator, as the efficiently may fall off as the difference between the frequencies increases. For example, the active element can be configured such that the frequencies are within 1.5% of each other. In some implementations, the frequencies can be approximately 90 kHz, and/or within a range from 88 kHz to 94 kHz. In a particular example, the frequency of the first mode can 88.9 kHz and the frequency of the second mode can 93.8 kHz.

Also, for effective operation of the active element, the active element can be configured such that there are no other natural frequencies of the active element that are within approximately 5% of the operating frequency of the modes to be excited (e.g., the cylinder and sinusoidal modes). For example, the nearest natural frequency to these modes can be at least 5 kHz away from the excited frequency, such that the undesired vibration mode is not excited by the drive frequency. Ensuring that other undesired modes are not excited can provide for efficient operation of the actuator.

In some implementations, switching of depth planes based on liquid lens pairs may necessitate use of actuator(s) that are consistent with the form factor and/or industrial design of an AR, a VR, or a MR glass or headsets. The active element outline is shown the example of FIG. 22. As shown in this example, the boundary conditions (e.g., maximum length) extend along the long axis of the part. The boundary conditions can be an important consideration in determining the natural frequencies of the active element. In some implementations, the natural frequencies of the two vibrational modes can match or be sufficiently close to one another (e.g., ±5%, ±10%, or ±15). In some implementations, the configuration can be modified to alter the vibrational frequencies such that they match one another or are sufficiently close to one another. In some implantations, the actuator can be configured to minimize the length of the active element while maintaining matched natural frequencies that are approximately 90 kHz.

Figure 26:
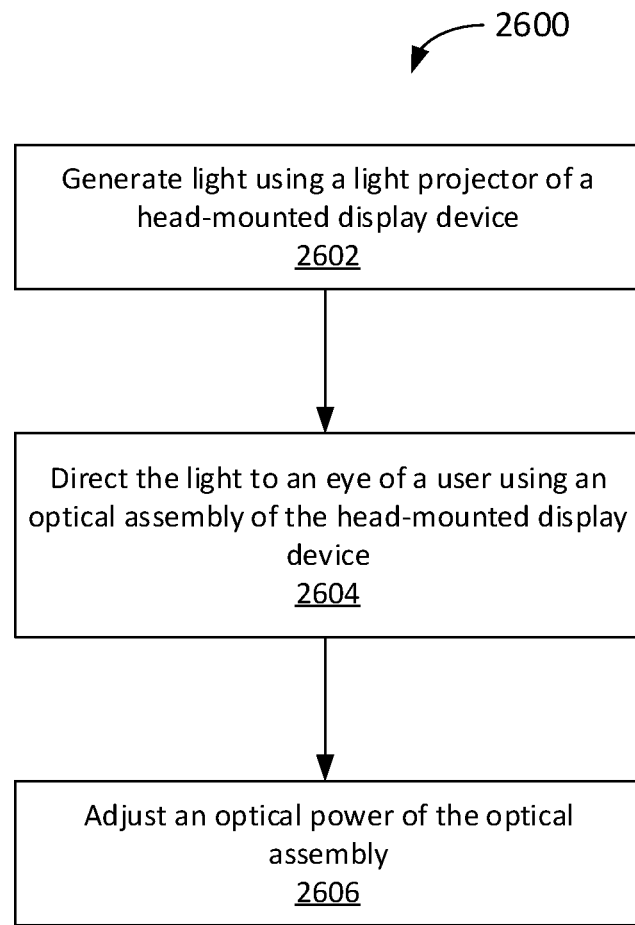
FIG. 26 is a flow chart diagram of an example process of presenting image content to a user using a head-mounted display device.

FIG. 26 is a flow chart diagram of an example process 2600 of presenting image content to a user using a head-mounted display device. In some implementations, the process 2600 can be performed, at least in part, using one or more of the systems or apparatus described herein.

According to the process 2600, light is generated using a light projector of a head-mounted display device (step 2602). An example head-mounted display device is described, for example, with respect to FIG. 1.

The light is directed to an eye of a user using an optical assembly of the head-mounted display device (step 2604). The optical assembly includes a variable focus lens assembly include a rigid refractive component, a shaper ring defining an aperture, a flexible lens membrane between the shaper ring and the rigid refractive component, and an actuator module coupled to the variable focus lens assembly. The flexible lens membrane covers the aperture. The rigid refractive component, the shaper ring, and the flexible lens membrane are arranged along an axis. The rigid refractive component and the flexible lens membrane define a chamber between the flexible lens membrane and the refractive component. A volume of fluid is disposed within the chamber. Example variable focus lens assemblies and their respective components are described, for example, with respect to FIGS. 2-25. Further, the head-mounted display device includes an actuator module coupled to the variable focus lens assembly An optical power of the optical assembly is adjusted (step 2606). Adjusting the optical power of the optical assembly includes moving the shaper ring relative to the rigid refractive component along the axis using the actuator module, such that a curvature of the flexible lens membrane in the aperture is modified. Examples of this adjustment technique are described, for instance, with respect to FIGS. 8A and 8B.

In some implementations, adjusting the optical power of the optical assembly can include increasing the curvature of the flexible lens membrane by moving the shaper ring towards the rigid refractive component along the axis. In some implementations, adjusting the optical power of the optical assembly can include decreasing the curvature of the flexible lens membrane by moving the shaper ring away from the rigid refractive component along the axis.

In some implementations, the variable focus lens assembly can also include a carrier frame, and a cam ring nested within the carrier frame, where the shaper ring is nested within the cam ring. Adjusting the optical power of the optical assembly can include rotating, using the actuator module, the cam ring relative to the carrier frame about the axis to cause the shaper ring to move relative to the rigid refractive component along the axis. Examples of this adjustment technique are described, for instance, with respect to FIGS. 9, 10A, 10B, 11, 12A, 12B, and 13A-13C.

In some implementations, wherein the actuator module can include a shape memory alloy wire coupled to the cam ring, and a heat source configured to apply heat to the shape memory alloy wire. Adjusting the optical power of the optical assembly can include applying heat to the shape memory alloy wire to change in a length of the shape memory alloy wire and to rotate the cam ring relative to the carrier frame about the axis. Examples of this adjustment technique are described, for instance, with respect to FIG. 14.

In some implementations, the actuator module can include a shape memory alloy spring, a bias spring opposing the shape memory alloy spring, a linkage wire coupled to (i) one of the shape memory alloy spring or the bias spring and (ii) the cam ring, and a heat source configured to apply heat to the shape memory alloy wire. Adjusting the optical power of the optical assembly can include applying heat to the shape memory alloy wire to change in a length of the shape memory alloy spring and to rotate the cam ring relative to the carrier frame about the axis. Examples of this adjustment technique are described, for instance, with respect to FIGS. 15A and 15B.

In some implementations, the actuator module can include one or more permanent magnets disposed along a periphery of one of the carrier frame or the cam ring, and electrical windings disposed along a periphery of the other one of the carrier frame or the cam ring opposite the one or more permanent magnets. Adjusting the optical power of the optical assembly can include applying electrical current to the electrical windings to rotate the cam ring relative to the carrier frame about the axis. Examples of this adjustment technique are described, for instance, with respect to FIGS. 16A-16C, 17, and 18.

In some implementations, the actuator module can include a plate having a piezoelectric material, and one or more arms extending from the plate and coupled to a mechanical ground, one or more mounting structures disposed on the plate. Each mounting structure can be mounted to a respective portion of the optical assembly. Adjusting the optical power of the optical assembly can include vibrating the plate according to at least two vibration modes. Examples of this adjustment technique are described, for instance, with respect to FIGS. 22, 23, 24A, and 24B.

In some implementations, the plate can include a pair of opposing first edges extending a first direction, and a pair of opposing second edges extending a second direction orthogonal to the first direction, where the first edges are longer than the second edges. Vibrating the plate according to according to a first vibration mode of the at least two vibration modes can include displacing the first edges relative to a center of the plate in a third direction orthogonal to the first direction and the second direction (e.g., as shown in FIG. 24A). Vibrating the plate according to according to a second vibration mode of the at least two vibration modes can include displacing the second edges relative to one another in the second direction (e.g., as shown in FIG. 24B).

In some implementations, wherein the optical assembly can include a second variable focus lens assembly concentric with the variable focus lens assembly. The process 2600 can include adjusting an optical power of the second variable focus lens assembly concurrently with adjust the optical power of the variable focus lens assembly, such that the optical power of the variable focus lens assembly is the inverse of the optical power of the second variable focus lens assembly (e.g., as described with respect to FIG. 25).

In some implementations, directing the light to the eye of the user can include directing the light through one of the variable focus lens assembly or the second variable focus lens assembly to the eye of the user.

Appendix A lists an example specification for actuator(s) that may be employed in some embodiments. Appendix B lists an example specification for an Inner Lens Assembly that may be employed in some embodiments. Appendix C lists an example specification for an Outer Lens Assembly that may be employed in some embodiments. Embodiments are not limited to these examples, and other suitable values may be employed.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act may include one or more steps in which the end user may obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

APPENDIX A—EXAMPLE ACTUATOR SPECIFICATIONS

Mass: <7.9 grams
Thrust and start thrust: ±1 N to ±4 N
Speed: 50 mm/sec
Stroke: 0.8-3.5 mm
Dynamics of moving system (Transfer Function: stiffness (k), mass damping (m), natural frequency ($f_n$) and damping ratio ($\xi$)):meff <5 grams, k >2.0 N/mm-4 N/mm or 4.0 N/mm-8 N/mm, $f_n$ is between 30-200 Hertz, $\xi$ is between 0.5-3.0.
Positioning accuracy (allowable motor error motions for six degrees of freedom): ±0.2 mm
Minimum possible motion step: <1 μm
Orientation (tip/tilt) uncertainty: <120 arcminutes
Distributed load characteristics: ϕ 40 mm
Duty Cycle: 12 million switches at a frequency of 0.3 *Hz
Form Factor of motor: Dimensions <33×16×9.2 mm
Form Factor for actuated elements: Φ 40 mm with distributed load
Allowable deformation of mechanical components and mounting locations: <0.020-0.300 mm
Self-locking holding force: >1.2× actuation force
Power consumption: Average <0.5 Watts, Maximum <1.0 Watts
Driving sound (allowable noise): <25-32 dbA at 25 mm
Heating value: <1 Watt
Temperature during drive: <60 C
Lifetime: 10,000 hours
Usage environment (usage temperature, usage humidity): ambient temperature range of −10° C. to +55° C., non-condensing humidity 5-95%
Shock resistance: survive drop of 1 m in 3 orientations with no damage

APPENDIX B—EXAMPLE INNER LENS ASSEMBLY ("ILA") SPECIFICATIONS

Travel range: 721 μm. In some examples, travel range is the combination of alignment offset and the actual motion requirements of the system
Maximum load spring force: 2.24±0.3 N
Minimum load spring force: 0.70±0.3 N
Moving shaper ring mass: 0.62 grams
Load stiffness: $k_{m\_ILA}$=2.75 N/mm
Lens damping: $\xi$~1.0
System natural frequency: ~100 Hz
Decenter of refractive to shaper element (datum): ±0.05 mm Focal power error (combined ILA and OLA): <0.1 Diopter Focal power error (System 'I'-virtual): <0.1 Diopter Flatness of drive ring attached to membrane: <10 μm Tilt/tip of drive ring attached to membrane: <3 arc minutes

APPENDIX C—EXAMPLE OUTER LENS ASSEMBLY ("OLA") SPECIFICATIONS

Travel range: 760 μm. In some examples, travel range is the combination of alignment offset and the actual motion requirements of the system Maximum load spring force: 3.21±0.3 N Minimum load spring force: 1.35±0.3 N Moving shaper ring mass: 0.72 grams Load stiffness: $k_{m\_OLA}$=3.31 N/mm Lens damping: $\xi$~1.0

System natural frequency: ~100 Hz

Decenter of refractive to shaper element (datum): ±0.05 mm

Focal power error (combined ILA and OLA): <0.1 Diopter

Focal power error (System 'I'-virtual): <0.1 Diopter

Flatness of drive ring attached to membrane: <10 μm

Tilt/tip of drive ring attached to membrane: <3 arc minutes

What is claimed is:

1. A head-mounted display device comprising:
a light projector;
an optical assembly arranged to receive light from the light projector and direct the light to a user during use of the head-mounted display device, wherein the optical assembly comprises a variable focus lens assembly comprising:
a rigid refractive component,
a shaper ring defining an aperture,
a flexible lens membrane between the shaper ring and the rigid refractive component, the flexible lens membrane covering the aperture,
a carrier frame, and
a cam ring nested within the carrier frame, the cam ring encircling the flexible lens membrane,
wherein the shaper ring is nested within the cam ring,
wherein the rigid refractive component, the shaper ring, and the flexible lens membrane are arranged along an axis,
wherein the rigid refractive component and the flexible lens membrane define a chamber between the flexible lens membrane and the refractive component,
wherein a volume of fluid is disposed within the chamber, and
wherein the cam ring is configured such that a rotation of the cam ring relative to the carrier frame about the axis causes the shaper ring to move relative to the rigid refractive component along the axis; and
an actuator module coupled to the variable focus lens assembly, wherein the actuator module is configured to adjust an optical power of the variable focus lens assembly by rotating the cam ring relative to the carrier frame about the axis to cause the shaper ring to move relative to the rigid refractive component along the axis, such that a curvature of the flexible lens membrane in the aperture is modified, wherein the actuator module comprises:
a plate comprising a piezoelectric material,
one or more arms extending from the plate and coupled to a mechanical ground, and
one or more mounting structures disposed on the plate, wherein each mounting structure is mounted to a respective portion of the optical assembly,
wherein the actuator module is configured to vibrate the plate according to at least two vibration modes,
wherein the plate comprises a pair of opposing first edges extending a first direction, and a pair of opposing second edges extending a second direction orthogonal to the first direction, wherein the first edges are longer than the second edges,
wherein according to a first vibration mode, the first edges are displaced relative to a center of the plate in a third direction orthogonal to the first direction and the second direction, and
wherein according to a second vibration mode, the second edges are displaced relative to one another in the second direction.

2. The head-mounted display device of claim 1, wherein the actuator module is configured to move the shaper ring relative to the rigid refractive component through a range of motion, and
wherein the variable focus lens assembly is configured such that the chamber has a constant volume when the shaper ring is moved relative to the rigid refractive component through the range of motion.

3. The head-mounted display device of claim 1, wherein the actuator module is configured to increase the curvature of the flexible lens membrane by moving the shaper ring towards the rigid refractive component along the axis.

4. The head-mounted display device of claim 1, wherein the actuator module is configured to decrease the curvature of the flexible lens membrane by moving the shaper ring away from the rigid refractive component along the axis.

5. The head-mounted display device of claim 1, wherein the variable focus lens assembly further comprises an annular membrane disposed within the aperture, and
wherein the volume of fluid is encapsulated by the rigid refractive component, the flexible lens membrane, and annular membrane.

6. The head-mounted display device of claim 1, wherein the shaper ring is rigid.

7. The head-mounted display device of claim 1, wherein the actuator module comprises one or more actuator components coupled to the cam ring selected from the group consisting of: rotary motors, stepper motors, servo motors, ultrasonic motors, piezoelectric actuators, and electromechanical actuators.

8. The head-mounted display device of claim 1, wherein the optical assembly comprises a second variable focus lens assembly concentric with the variable focus lens assembly, and
wherein the actuator module is configured, during use of the head-mounted display device, to adjust the optical power of the variable focus lens assembly and an optical power of the second variable focus lens assembly, such that the optical power of the variable focus lens assembly is the inverse of the optical power of the second variable focus lens assembly.

9. The head-mounted display device of claim 8, wherein the optical assembly further comprises an eyepiece disposed between the variable focus lens assembly and the second variable focus lens assembly,
wherein the eyepiece is configured to receive the light from the light projector and direct the light through one of the variable focus lens assembly or the second variable focus lens assembly to the user during use of the head-mounted display device.

10. The head-mounted display device of claim 8, further comprising a control module configured to control the actuator module during use of the head-mounted display device, such that the optical power of the variable focus lens assembly is the inverse of the optical power of the second variable focus lens assembly.

11. The head-mounted display of claim 1, further comprising:
a frame attached to the light projector, the optical assembly, and the actuator module, wherein the frame is configured, when worn by the user, to orient the optical assembly such that the axis extends towards an eye of the user.

12. A method of presenting image content to a user using a head-mounted display device, the method comprising:
generating light using a light projector of a head-mounted display device;
directing the light to an eye of a user using an optical assembly of the head-mounted display device, wherein the optical assembly comprises a variable focus lens assembly comprising:
a rigid refractive component,
a shaper ring defining an aperture,
a flexible lens membrane between the shaper ring and the rigid refractive component, the flexible lens membrane covering the aperture,
a carrier frame, and
a cam ring nested within the carrier frame, the cam ring encircling the flexible lens membrane,
wherein the shaper ring is nested within the cam ring,
wherein the rigid refractive component, the shaper ring, and the flexible lens membrane are arranged along an axis,
wherein the rigid refractive component and the flexible lens membrane define a chamber between the flexible lens membrane and the refractive component,
wherein a volume of fluid is disposed within the chamber,
wherein the cam ring is configured such that a rotation of the cam ring relative to the carrier frame about the axis causes the shaper ring to move relative to the rigid refractive component along the axis, and
wherein the head-mounted display device comprises an actuator module coupled to the variable focus lens assembly; and
adjusting an optical power of the optical assembly, wherein adjusting the optical power of the optical assembly comprises using the actuator module to rotate the cam ring relative to the carrier frame about the axis to cause the shaper ring to move relative to the rigid refractive component along the axis, such that a curvature of the flexible lens membrane in the aperture is modified, wherein the actuator module comprises:
a plate comprising a piezoelectric material,
one or more arms extending from the plate and coupled to a mechanical ground, and
one or more mounting structures disposed on the plate, wherein each mounting structure is mounted to a respective portion of the optical assembly,
wherein the actuator module is configured to vibrate the plate according to at least two vibration modes,
wherein the plate comprises a pair of opposing first edges extending a first direction, and a pair of opposing second edges extending a second direction orthogonal to the first direction, wherein the first edges are longer than the second edges,
wherein according to a first vibration mode, the first edges are displaced relative to a center of the plate in a third direction orthogonal to the first direction and the second direction, and
wherein according to a second vibration mode, the second edges are displaced relative to one another in the second direction.

13. The method of claim 12, wherein adjusting the optical power of the optical assembly comprises increasing the curvature of the flexible lens membrane by moving the shaper ring towards the rigid refractive component along the axis.

14. The method of claim 12, wherein adjusting the optical power of the optical assembly comprises decreasing the curvature of the flexible lens membrane by moving the shaper ring away from the rigid refractive component along the axis.

15. The method of claim 12,
wherein the optical assembly comprises a second variable focus lens assembly concentric with the variable focus lens assembly, and
wherein the method further comprises:
adjusting an optical power of the second variable focus lens assembly concurrently with adjusting the optical power of the variable focus lens assembly, such that the optical power of the variable focus lens assembly is the inverse of the optical power of the second variable focus lens assembly.

16. The method of claim 15, wherein directing the light to the eye of the user comprises directing the light through one of the variable focus lens assembly or the second variable focus lens assembly to the eye of the user.

* * * * *